(12) United States Patent
Prakash

(10) Patent No.: US 11,100,049 B2
(45) Date of Patent: Aug. 24, 2021

(54) CUSTOMIZABLE BROWSER FOR COMPUTER FILESYSTEM AND ELECTRONIC MAIL

(71) Applicant: Saurabh A. Prakash, Gurgaon (IN)

(72) Inventor: Saurabh A. Prakash, Gurgaon (IN)

(*) Notice: Subject to any disclaimer, the term of this patent is extended or adjusted under 35 U.S.C. 154(b) by 67 days.

(21) Appl. No.: 15/761,106

(22) PCT Filed: Sep. 26, 2016

(86) PCT No.: PCT/IB2016/055730
§ 371 (c)(1),
(2) Date: Mar. 18, 2018

(87) PCT Pub. No.: WO2017/051390
PCT Pub. Date: Mar. 30, 2017

(65) Prior Publication Data
US 2019/0294587 A1    Sep. 26, 2019

Related U.S. Application Data

(60) Provisional application No. 62/233,411, filed on Sep. 27, 2015, provisional application No. 62/393,330, filed on Sep. 12, 2016.

(30) Foreign Application Priority Data

Sep. 26, 2016   (WO) .................. PCT/IB2016/055730

(51) Int. Cl.
*G06F 16/16*      (2019.01)
*G06F 3/0481*    (2013.01)
(Continued)

(52) U.S. Cl.
CPC .......... *G06F 16/168* (2019.01); *G06F 3/0481* (2013.01); *G06F 3/0482* (2013.01);
(Continued)

(58) Field of Classification Search
CPC ... G06F 16/168; G06F 3/04817; G06F 3/0482
See application file for complete search history.

(56) References Cited

U.S. PATENT DOCUMENTS 7,461,088 B2   12/2008   Christopher Thormon et al.
7,568,151 B2    7/2009   Bargeron et al.
(Continued)

*Primary Examiner* — Angie Badawi
(74) *Attorney, Agent, or Firm* — Singh Law Firm, PLLC; Gautam B. Singh

(57) ABSTRACT

A system for including visualization annotations on folders, files and media in a computer filesystem is disclosed. The system enables the use of a plurality of methods for customizing the fonts, icons shapes, icon sizes and other visual attributes of filesystem artifacts and enables these annotations to be updated upon the occurrence of certain events so as to effectuate the process of audiovisual reminders for user and drawing their attention to contingencies specified through rules or macros. The system integrates with a computer electronic mail system to automatically save or facilitate the user in saving files attached to email messages from specified addresses into designated folders that are programmed to offer audiovisual cues to the user and draw their attention to priority documents. Similarly, uploading and attaching files to email addressed to a particular recipient is facilitated by designating email-specific preferred folders. Rules also trigger the assignment of a file or a folder to a predefined "high priority" folder that maintains links to user selected files for monitoring through visualization cues as well as ease of access.

14 Claims, 14 Drawing Sheets

(51) Int. Cl.
   *G06F 3/0482*     (2013.01)
   *H04L 12/58*      (2006.01)
   *G06Q 10/10*      (2012.01)
   *G06F 3/16*       (2006.01)

(52) U.S. Cl.
   CPC .......... *G06F 3/04817* (2013.01); *G06F 3/165* (2013.01); *G06Q 10/107* (2013.01); *H04L 51/08* (2013.01); *H04L 51/22* (2013.01)

(56) References Cited

U.S. PATENT DOCUMENTS

| | | |
|---|---|---|
| 8,645,866 B2 | 2/2014 | Nestler et al. |
| 2004/0158607 A1* | 8/2004 | Coppinger ........... G06Q 10/107 709/206 |
| 2006/0031340 A1* | 2/2006 | Mathew ............... G06Q 10/107 709/206 |
| 2006/0195526 A1* | 8/2006 | Lederer ................ G06Q 10/107 709/206 |
| 2007/0011622 A1 | 1/2007 | Chae et al. |
| 2008/0168340 A1* | 7/2008 | Jang ....................... G06F 16/168 715/206 |
| 2009/0319618 A1* | 12/2009 | Affronti ................. H04L 51/16 709/206 |
| 2012/0151013 A1* | 6/2012 | Kang .................. G06F 13/4282 709/219 |
| 2013/0174069 A1* | 7/2013 | Lee .................... G06F 3/04817 715/769 |

* cited by examiner

| File | Type | Size | Modification Date |
|---|---|---|---|
| ToDo-Deadlines | File | 1K | 01-01-2013 |
| Active Cases Folder | Folder | | 11-18-2012 |
| Appeals Folder | Folder | | 04-12-2011 |
| Accident Reconstruction | File | 3,566 K | 08-03-2014 |
| Clients | Folder | | 07-09-2011 |
| MarketCampaings | Folder | | 05-24-2013 |
| Research | Folder | | 03-11-2011 |
| Case Opinion | File | 1,023 K | 09-03-2013 |

FIG. 3

CUSTOMIZABLE BROWSER FOR COMPUTER FILESYSTEM AND ELECTRONIC MAIL

CROSS REFERENCE AND RELATED APPLICATION

The application claims the benefits of U.S. Provisional Patent Application Ser. No. 62/233,411 filed on Sep. 27, 2015, by Inventor Saurabh A. Prakash, and U.S. Provisional Application Ser. No. 62/393,330 filed on Sep. 12, 2016, by Inventor Saurabh A. Prakash, both of which are incorporated herein by reference.

TECHNICAL FIELD

The present application relates generally to the field of computer software. More particularly, the present invention relates to a method and system for user customized browsing of files (word, data, music, pictures, video and other media) and folders on a computer system. The objective of customizing views of a file browser is to readily identify and to draw attention towards important data artifacts stored on a computer's shell or file system.

BACKGROUND OF THE INVENTION

Computer systems store information in files. These files are further organized into a hierarchical filing cabinet where each cabinet can contain a plurality of files and is referred to as a folder in computer jargon. In the physical world, users often use color-coding of files to indicate their significance, functional categorization, or nonfunctional groupings. The names of files could be written in different colors to distinguish them from other files. One could paste the logo of a company on the file cover to quickly identify it to be of that company. Similarly, in the physical world, the sizes of physically large folders will draw attention by their sheer size is an identification tool for the user. However, similar visual aids are not available in a computer system's filing system.

Computer systems store files on a disk system or other storage devices. These files contain information for later retrieval by the users of the computer system. Current approaches for search and later retrieval of files from the computer system utilizes either searching by the name of the file or folder or by some character string contained in its name or within the file. Such a retrieval strategy limits the options for the users in that the user must know the character string in the file name or folder name that being searched for within the contents of the file or its name. The current file browsing system only allow for limited set of options for sorting in an ascending or descending manner based on the names, size, creation, access, or the modification date of the file or folder. It is desirable for the user of the computer system to have additional options for sorting the files and folders for quicker search of files or folders using mechanisms other than the substrings of the content or the name of the file or folder. Therefore it is desirable and advantageous to have files and folders that can be marked in a manner that assists quick identification through the use of visual cues such as highlighting or bold-facing or underlining or by flashing of the names of the files and folder.

No Customized Icons:

Computer file browsers today utilize a multitude of icons for easy identification of devices, network mounted file systems, shared file systems, and local file systems. A multitude of icons are also used for identifying the types of files stored in a folder, such as video files, music files, picture files, text files. Files associated with a specific application such as their predefined icons readily identify Word, Excel or PowerPoint. The current browsers do not support a customized use of icons allowing user to associate custom renderings for files and folders including icons, and other presentation styles for display of the files, folders and media.

Uniform Sized Icons for all Files and Folders:

In the currently available computer file and shell browsers, generally icons of all folders are in the same color. Computer browsers offer the ability of personalization of file and folder view by allowing the user to select a specific color scheme for presentation, though icons of folders are generally presented with same color, shape and size. Although icons of other media such as disks or pen drives may be distinct, there is uniformity in how each the external media is displayed. As such, the presentation of these items also cannot be customized or changed, except for some limited display options that are applied to entire set of external media at large. Sometimes it is desirable for the user to have different icon sizes for different folders or use a different icon for specific file of same type. The current file browsers limit the extent to which the file and folders sizes may be changed in a customized manner.

Further, current computer file browsers do not provide the ability to accentuate the text used for displaying the names of files or folders. That is, current file browsers display all file or folder names in same color with same font type. What is needed is the ability to individually change the fonts and accentuate the names of specific files and folders, for example, by using bold, underlined, italicized, or highlighted fonts or by making specific file or folder names displayed in flashing mode or through animated text.

Browsers Only Support Simple Annotations Like a Color Dot:

Similarly the user cannot give different colors or shapes to the icons of at will to similar files or folders. Some browsers do permit the user to give different colors to folders or to place a colored dot in front of the folder. However, what is needed is a system that enables additional visual representational cues about files and folders. What is desirable is a level of personalization for rendering files and folders that lets the users identify folders and files based on their own visualization criteria, or by a characteristic sound associated with the files or folders. What is desirable is also to allow the user to have customized criteria such as for visual rendering based on the importance or the type of subject matter stored in the file.

Icon Size does not Change:

Current file browsing systems do not allow changing the size of icons representing files and folders, for example, making the icon size bigger for files or folders containing important information thereby drawing user's attention and reducing the time needed for the users to reach that information.

Sound Annotations not Supported:

In the current implementation of computer file and shell browsers, folders as well as files cannot be associated with a characteristic sound. It is sometimes desirable for users to associate sounds with files, folders and media items where the sounds are used for identification or otherwise customized annotation of the items. And since this sound is contained in the browser's metadata, the sound is produced without the need for first opening the file. If the browser provides such an option, the user single clicking on the folder, file or media item will produce that associated sound and thereby facilitate in providing further information annotated on the item. Further, it is desirable to have the system change the associated sound-clip on the happening of a given contingency and where more than one outcome is possible, have the file or folder be associated with different sounds as prescribed by the user. In this manner, it is desirable for the system to inform the user that a condition has occurred based on the sound that the computer browser produces. Additionally, such an option will not only greatly assist normal users, they will offer vital assistance to the visually impaired in accessing the computer folders, files and media items.

No Special Annotations for Time Sensitive Elements:

Computer file browsers generally display thumbnail view of folders and files using display settings that are set uniformly across the entire file systems. For example, all Microsoft Word files are displayed using the same icon enabling a user to quickly scan for and find Microsoft Word documents. However, such a view also limits the amount of information about the file content to only what is readily discernable from the name of the file or folder. However, nothing in the file name will let the user know the potential time sensitivity of the information contained therein. For example, nothing in the file name will suggest to the user that it contains a proposal that is due in a few days or that it is simply a routine inter-office memorandum.

No Customization of Icons, Text and Color, and Time Sensitivity:

What is needed is a computer file browsing system that allows users to specify the display settings for files and folders that accentuate properties such as color, size and shape of the icon and the text used for visual display of the file or folder. There are only limited options available in currently available computer file browsers without any ability of customization or personalization. There exists a need for providing users' with the ability to create file or folder markings that quickly "draws" the attention of the user to the specific files, folder or media based possibly on the time sensitivity and importance of information stored therein.

No Provision for Special Email Processing:

It is also desirable to have any documents received as attachments to emails to get automatically saved by the browser running the background and have such an event annotated on a specific folder where the attached files are saved. Current email processing requires the user to specify such a destination folder where the document should be saved. This can sometimes take time and disrupt the workflow when a large number of documents are received, or when their individual size is large, or both. What is needed is a computer folder automatic saving procedure that provides for the rules about the destination folders where the files attached to a specific sender's emails are saved and how the presentation or display of these folders will change subsequent to the saving of such email attachments.

No Capability for Versioning Visualization:

Computer file browsers currently do not support effective versioning of files. As an example if a first user exchanges a file with second user and receives an updated file by the same name, the first user can save it by overwriting their earlier file, or save it under a different name.

The first user devises a name versioning scheme whereby the first user can know which of the versions is the newer version, or review the file's metadata. What is desirable is the ability for file browser to save the versions of the file with the same name but with a series of predefined colors used to designate versioning.

Unavailability of Machine Coded File Handles:

It is also desirable that in addition to names, all folders, files and media be permitted to be associated with bar codes, a QR-code, or other such identifying codes. This will enable a quick identification of files by other computers or devices such as mobile scanners. The bar codes are typically placed on the name or associated field and be read by another device. The browser should also be capable of searching for files based on these codes either directly under the command of another device, or by a human.

SUMMARY OF THE INVENTION

Definitions

Artifact—Any member of the computer filesystem including, a file, a folder, or a media item
Icon Style—The shape, size, color, and the thumbnail image used for presenting an icon
Text Style—The typeface, type weight, and decorations (animations) used in displaying text
GUI—Graphical User Interface used in a computer system
File Browser—A GUI based software application for browsing through the contents of the filesystem artifacts on a computer system
Presentation Attributes of an Artifact—The icon style and text style used by the File Browser for displaying a filesystem Artifact
Customization of Filesystem Artifact Presentation The present invention is directed towards customizing the display of files, folders, and media based on user-specified rules and conditions. The folder icons can be presented with a plurality of shapes and sizes. The invention provides the ability to the users to highlight file, media and folder names using a plurality of fonts weights, sizes and colors. Selected set or all files, folder and media items can be displayed with user-customized icons. The invention further enables an automatic saving, or guiding the user in saving of files, folders and media items received as attachments to an email providing the user with the ability to save attached items in folders specified and associated with the email address of the sender. For instance, since users often store files originating from the same sender in specified sub-folders, an embodiment of the invention allows the user to specify that all attachments, or attachments of specified types—such as Word, Excel and PDF files, received from a specific email address be automatically saved to pre-specified destination folders. The invention further allows the user to prescribe that an alert be generated when an email attachment from a specific sender has been so received and saved in a specific folder and correspondingly change the presentation of the associated folder.

The names of the files, folders or media items are displayed wholly or partly in color, using font types and sizes, with background highlighting, with a boldface, underlined or italicized style, or blink or flash. These attributes are individually changed by the user including applying these changes to portion of names of these items. The customized file browser also allows the sorting of files, folders and media based on the style attributes.

Defining Default Style for a Folder and its Hierarchical Application

The customizable file browser disclosed uses a default setting for the filesystem artifacts that can be customized by the user. The changes may be further applied hierarchically to all the children of an artifact or be limited to the shallow instance. For example, the user can define the default setting the name of a folder, file or media to be other than system default of black. Furthermore, the user can define a particular default style for a particular folder such that all files and subfolder names in that folder will hierarchically use that style thus making all file, folder and media names to appear in "red" color. The user can over-ride this default setting for individual sub-folders whereupon this change can be optionally propagated to all its children.

Sorting Based on Style

In an embodiment of the invention, the user is allowed to present the content of a computer directory or folder with names sorted by the style attribute where the names using a particular style are placed lexicographically higher than those not using the style. Styles are prioritized in a scheme selected by the user with each style defining a level of significance in the overall priority scheme. The style based lexicographic ordering scheme also applies to artifact names that are partially in boldface, underlined, or italicized fonts with the names that partially use the style are lexicographically lower than the names that fully use the style.

Saved as Meta Data or in the Preview

The disclosed system provides a user with options to define the display settings for a given file, folder, or media item, or for a set of files, folders, or media items. A variety of criteria may be used for defining color, shape, sound, and icon size for a target item. In an embodiment of the invention, these values for file, folder and media previews are saved as metadata with the associated files, folders and media items. In an embodiment of the invention, the properties are defined and saved by the file browser and used while previewing the related file, folder or media item.

In the invention disclosed, an enhanced system that allows users of a computer system to incorporate a customized visualization of the files and folders is disclosed which forms a basis of additional criteria that makes them easier to locate.

The system disclosed in this application provides such a customized visualization methodology that helps increase the users' productivity by increasing the searching or sorting choices for the users by enabling a plurality of attributes or properties for the file or folder which can be searched independently or in conjunction with other search options.

What is also implemented is that the user can specify that some of these attributes would apply change on the happening of certain contingencies. If the user notices such a change in such attribute, he would immediately know that such contingency had occurred, or not occurred, and could therefore take such steps as he deems fit to take.

Time Sensitivity Annotations—Icons and Name Changes Supported

What is also disclosed is that the user be able to set conditions in which the system will alert the users to some events by, for example, highlighting a file or folder name. Hence if the user knows today that a file has to be sent to a recipient in five (5) days, they can set a four (4) day alert to highlight the file and/or folder so as to draw attention to the pending file.

Further, the disclosed invention incorporates a rule-based modification of presentation attributes of associated filesystem artifacts. The Customized Browser disclosed herein offers the ability to change these presentation attributes after the passage of prescribed period of time or upon the happening of a prescribed contingency. Thus, if the user so specifies with by associating a rule based on the size of a file or folder, its icon style would change, or its name style would change when the file size increases beyond a threshold. Similarly, if the file contains some time sensitive content, its presentation attributes could change when the file remains unopened for a pre-specified number of days.

Versioning

The system disclosed allows multiple version of a file to be saved with the same name but with a different colors. The user can define the colors that would be given to the previous versions and also the number of previous versions to retain. Thus for instance the user can prescribe that the name of the latest file be yellow while of the previous one be red and the one previous to that be blue and that no version prior to be retained. The user can also prescribe that unless the latest version has been seen or opened, no automatic saving of further newer versions be allowed to occur. This guards against the accidental wiping out of previous versions if several updated documents are received within a short time.

Automatic and Guided Saving of Email Attachment

In an embodiment of the invention, file and folder attributes are automatically changed based on the computer system receiving an electronic mail. In a typical computer system, electronic mail is received and stored in the inbox. Customized browser processes these attachments by saving these to a designated folder specified by the user or the rules specified. The user can define rules that prescribe how an email received from a particular email address will be automatically saved in a particular folder. Alternatively, the user can prescribe that the user be guided to save the file to a folder rather than automatically save the attachment. The user can prescribe a different folder for a plurality of sender addresses. The user can further override the default folder settings for particular threads of emails and prescribe an alternate target folder.

When an email attachment is automatically saved to a designated folder the user prescribe the manner in which folder's presentation characteristics will be modified so as to alert the computer user to the fact of a document was so saved. Such presentation changes include the icon colors, icon size, icon shape, or the font style and color used in naming the folder. Other presentation modifications are supported by Customized Browser—such as adding a sign enclosed in a circle to the number indicating the documents saved in that folder. This facilitates in alerting the user of the computer system to review these attached files by going to that folder.

Furthermore, if the user does not prefer automatic saving, the documents are not saved automatically. Instead, the Customized Browser assists in saving the attached documents to a destination folder of user's choice. In the guided saving mode, the user is thus provided with a plurality of predefined choices to select the folder in which to save the attached document. This application therefore supports automatic saving to a specified location as well as a mode for guided saving to one or more of a plurality of pre-specified or dynamically specified locations.

Associating Machine Readable Codes with Files

In addition to names, all filesystem artifacts including folders, files and media, are allowed to have an associated bar code, QR-code, or a similar machine code generated for easy identification. These codes are placed on the filesystem artifact in addition to the human readable names assigned to each artifact. This feature is designed to assist in quick identification of files by other computers or devices that can rapidly search for and retrieve a file by the specified machine code. Humans also use the machine-readable code as a reference to the filesystem artifact. The invention disclosed processes human requests for machine code based search by placing a pop-up box and enabling the user to place the machine code therein to begin the search process.

BRIEF DESCRIPTION OF DRAWINGS

The invention will be described in conjunction with the attached drawings in which referenced numerals designate elements, and wherein.

FIG. 3 illustrates an embodiment of the invention that includes user customized icons for files and folders;

DETAILED DESCRIPTION

Figure 1:
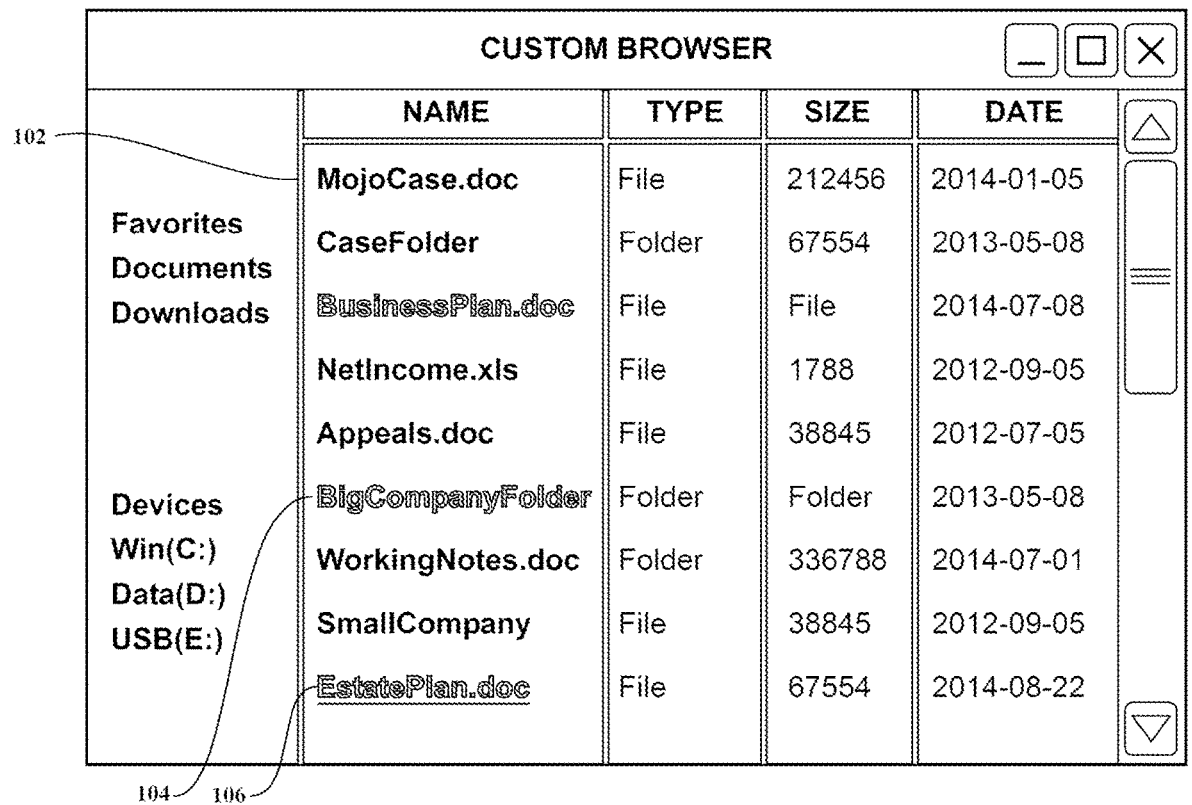
FIG. 1 illustrates an embodiment of the invention where filename and folder names are displayed with user customized colors, font weight, style and size.

One method for drawing attention to a specific section of text, or otherwise indicating its importance, relevance or significance in text documents is through the use of highlighting text. Typical methods for highlighting text include using bigger font sizes, boldface fonts, and italicized fonts, underlining text, or using different colors for rendering text. While these methods are commonplace and in general use when it comes to written text, similar methods are not applicable to displaying names of files and folders or filesystem artifacts displayed on a computer filesystem. While operating system allow changing the file and folder viewing options of the computer's operating system at the system-wide level, changing color, fonts, icons, and highlighting of filesystem artifact names or icons is not supported at the level of individual files. Since rendering file and folder names in such cases apply to all files and folders uniformly, there is nothing in them to distinguish files or folders from each other. What is disclosed is a system for displaying filesystem artifacts in a customizable form where the user selects the visualization details of the file, folder or media, as well as rules are provided whereby the visual features are changed automatically. What is also disclosed is the integration of the system with computer system email browser for a customized attaching and saving of email attachments and rendering and visualization of the artifacts including the target folders.

Color-coding of electronic filing cabinets, or computer folders, or files include an option for users to add a plurality of color codes and sorting files in a folder using a sorting code that is derived from the name and icon customizations. The computer system file browser offers a functionality to search the file system by visualization customization codes assigned to the filesystem artifact. The invention also enables the color of the filesystem artifact to be changed based on the occurrence of an event. The system supports occurrence of a timing deadline as an event, or threshold size of a folder's or of more than one folder combined, or the threshold size of a file or of more than one file combined as yet another event upon which to condition the changing of custom visualization parameters. Thus the system annotations to be given and later be dynamically changed based on a predefined set of events or conditions that are significant for the user as rules. In this manner, the color to designates that a certain event, such as a time critical or mission critical file being saved to the folder, has occurred or not occurred. This would cause the color of the folder, or one of more other attributes of the folder, containing that file to change or cause the color or other attributes of a file to change. This system provides the option to carry the color changing effect to travel up the hierarchy of folders and thus enables the users to drill down to the critical file by following the color-coded "bread-crumbs" trails. The user may also prescribe that after browsing the file or folder that caused the contingency, the relevant folder's or file's annotation attribute changes be reversed. Thus the system would again be in readiness for another occurrence of such an event.

A system for customized display of a computer filesystem artifact is disclosed comprising a display surface; an artifact having a name, an icon, a create time, an access time and an update time defined by a computer clock where create time, the access time and the update time is each a number, a stored content having an associated size, a storage space where the storage space is allocated for storing the artifact's saved content in the computer filesystem, and a visual representation, where the visual representation further comprises of a name visual representation, wherein the name visual representation includes a font name, a font weight, font style, and a font color for the name, an icon visual representation, wherein the icon visual representation includes an icon image, icon color, and an icon size for the icon, a rendering subsystem adapted to create the customized display of the artifact on the display surface by including the name visual representation, and the icon visual representation. An embodiment of the system has an associated machine code, selected from a group consisting of (bar code, QR-code); a visual representation of the machine code; wherein the rendering subsystem's display of the artifact also includes the visual representation of the machine code. An embodiment of the system has an associated sound recording with an artifact; an audio representation of the sound recording adapted for playing through an audio speaker; wherein the rendering subsystem's display of the artifact further includes playing the audio representation upon receiving a cue.

FIG. 1 illustrates an embodiment of the invention where the text of a file's or a folder's name is displayed with user customized colors, font weight, style and size. In an embodiment of the invention, some file and folder names are displayed in boldface 102 to indicate their importance. In an embodiment of the invention some file and folder names are displayed in red 104 (represented in a alternate font in a black and white drawing) to indicate an impending or overdue deadline. In an embodiment of the invention some folder and files are displayed in a specific color 104, 106 (represented in a alternate font in a black and white drawing) to indicate that they are classified or legal documents. In an embodiment of the invention, the text of the name of a set of user specified files or folders are made to flash, or turn on and off intermittently. In an embodiment of the invention some file or folder names are underlined 106 to indicate that the document might contain additional notes. The file browser of the computer system thus allows its user to assign attributes with which the file and folder names are displayed based on font specification provided by the user for each individual file and folder. Files and folders are displayed with their default system-wide (or folder-wide) uniform font specification when the user does not provide an overriding font specification.

Figure 2:
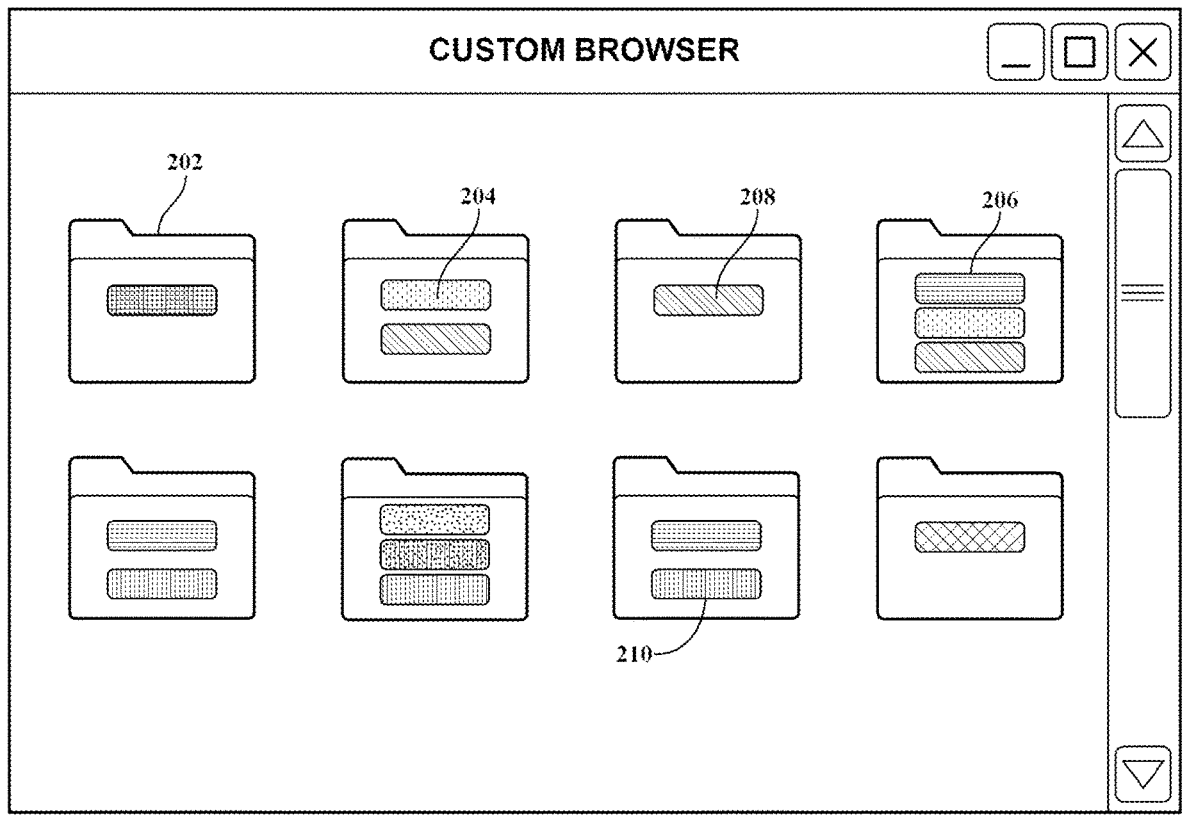
FIG. 2 illustrates the use of custom color codes for folders where multiple color codes are used for a folder.

FIG. 2 illustrates the use custom color codes for folders where multiple color codes are used for a folder. Users of computer systems decide what color (or colors) they wish to give to a folder. Options of several colors are provided. User is also permitted to make customized colors from a rainbow of colors. User can also prescribe multicolored folders. As an illustration for this functionality, indigo color 204 can be used to denote all cases that are currently active for that client, yellow 202 to denote all cases under consideration, blue to show concluded cases 206, green to show correspondence 208, and red 210 to denote cases where settlements were reached. It will be appreciated that colors are represented in a alternate shading pattern in black and white drawings. Such a user may give a particular folder more than one color if that folder contains files or sub-folders relevant to more than one such annotation. Thus, a search for folders of a particular color, the user is only presented with a view that shows folders that are annotated exclusively with that color, or as one of the annotations on that folder.

Disclosed is a system for customized display of a computer filesystem artifact where the artifact is a computer filesystem folder wherein the filesystem folder further includes a plurality of filesystem artifacts; wherein the rendering subsystem's display of icon size is adapted to be proportional to the size of contents of all the artifacts in the filesystem folder. An embodiment of the customized display of a computer filesystem artifact has the visual representation also includes a number representing the number of the plurality of artifacts stored belonging to the filesystem folder.

A system for customized display of a computer filesystem artifact is disclosed herein where the artifact has an associated membership to an VIP folder; a visual representation of the VIP folder; wherein the rendering subsystem's display of the VIP folder also includes the visual representation of artifact having an associated membership into the VIP folder.

The user can sort the folders by colors by prescribing a hierarchy of colors for sorting. In an embodiment of the invention the sorting order is based on VIBGYOR (Violet, Indigo, Blue, Green, Yellow, Orange, and Red), or any hierarchy the user prescribes. Using a logic similar to the one later described in FIG. 10, the users can choose to apply a color or sorting order to a folder, to all folders below it, or to a prescribed number of levels below it. In this manner, the system permits the use of different hierarchies for different folders based on the user prescribed sorting order. In an embodiment of the invention, multicolored folders prescribe hierarchy that it is according to number of colors and hence one with a larger number of colors would be higher. The user can search for folders that have a prescribed color, or multiple number of colors, or more that one of prescribed colors or any combination thereof.

In an embodiment of the invention, the user could prescribe for a given folder name to flash, or its name to flash upon the occurrence of a certain event such as after five (5) days of inactivity, or upon the size of the folder exceeding a threshold, or upon reduction of the size by a certain threshold, or upon the automatic saving of a document into that folder from an email client for example. In an embodiment of the invention it is permissible for the user to prescribe that the color of the folder would change upon a certain event or upon the automatic saving of a document to that folder.

FIG. 3 illustrates an embodiment of the invention that not only includes user customized font color but also includes user specified icons for files and folders. The system thus enables companies to design their own icons that would be picked up by the user and applied to filesystem artifacts as desired. The companies can also design their own signature tunes that would play when that folder is opened. These sounds or icons may also be used for identifying files and folders for distinguishing these from each other at a glance or by listening to the sound bite. At present the files and folders get easily identified because of their color and shape. The icons for folders are distinctly different from those of files 302. If the user allows all these features for folders as well as for files then it could become difficult to identify the files from the folders. Since under this system it is permissible to prescribe different icons 302 for files and for folders, it permits users to prescribe a dataset of permitted icons for folders and for files so as to be able to distinguish them by a quick glance.

In an embodiment of the invention it is possible for the user to define a datasets differently for each subfolder. Further, it is possible to prescribe that the symbol or an icon (such as "-", "." or ">") be placed against (before/after/above/below/upon) and icon to identify it as a folder or a file. The user is allowed several default options to choose from and is permitted to make their own icons as desired.

Figure 4:
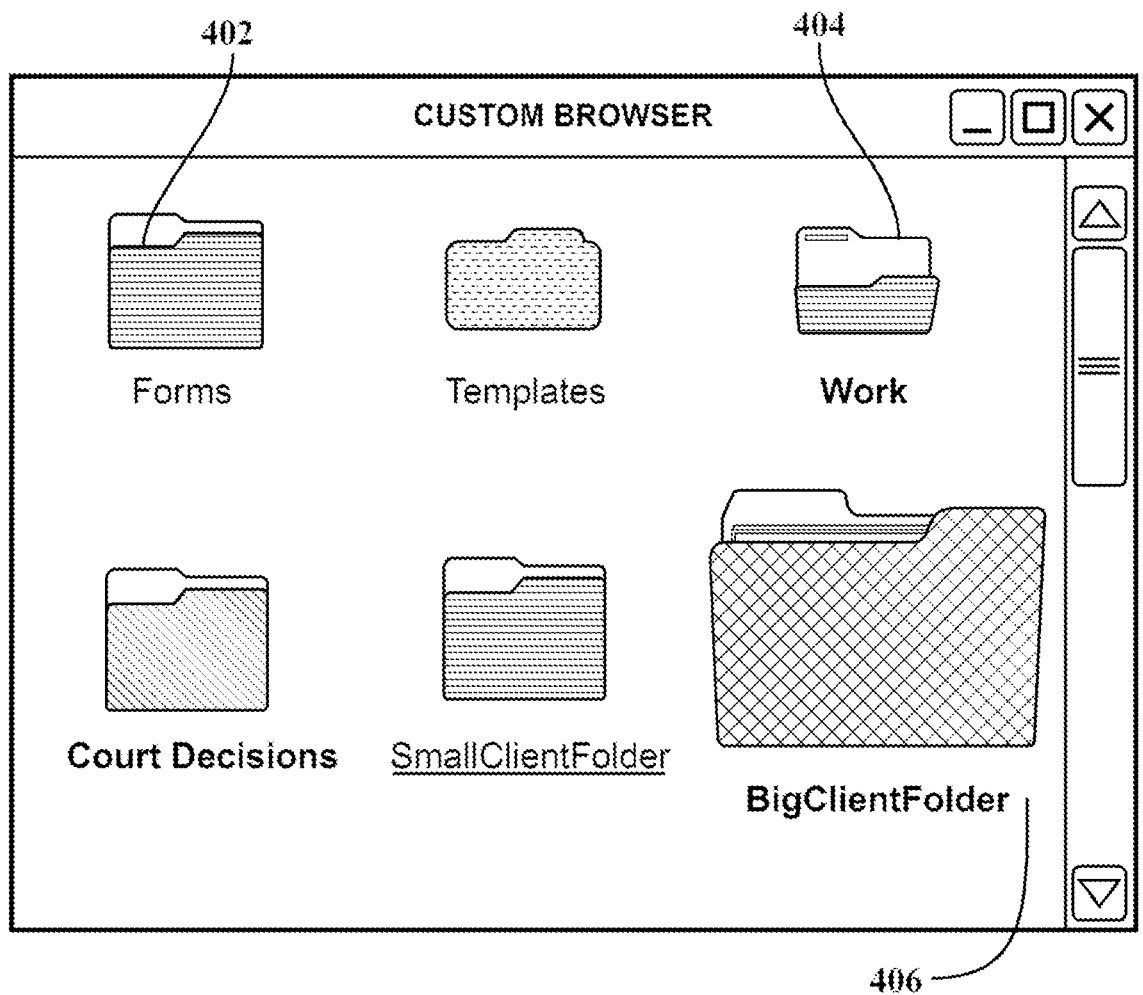
FIG. 4 illustrates an embodiment of the invention utilizing different colors and icons sizes for folders where the size of the folder icon depends upon the size of the folder or the importance of the contents of the folder to the user.

FIG. 4 illustrates an embodiment of the invention utilizing different colors and icons sizes for folders where the size of the folder icon depends upon the size of the folder or the importance of the contents of the folder. It will be appreciated that colors are represented in a alternate shading pattern in black and white drawings. In an embodiment of the invention, users decide the size of the icon for a given folder by selecting from a set of predefined sizes, or sizes created by the user. The size of the folder's icon could also be based on a numerical value based on the overall size of the contents of the files stored therein. In an embodiment of the invention, the size of the folder can also be determined by an event such as the size of all files in that folder exceeding a certain limit, or when and if the number of files in the folder exceeds a certain number or upon the saving of a document automatically into it. In an embodiment of the invention, if the count of sub-folders in a folder exceeded a certain number then it is displayed in with a certain sized icon 406. In an embodiment of the invention, if there were no activity on that folder for a predefined interval, then it is displayed with a larger than originally used icon 404. The folder icon size is updated based on any of these conditions. As an illustration, consider a legal application, a small sized folder icon 404 is being used for clients for whom there are 5 or less active cases. In an embodiment of the invention, the size the icon for a folder becomes small when there is no activity on any files in the folder for a predefined period of time or upon the saving of a document automatically to it. Additionally, size of a folder icon would increase or reduce according to the number of files or size of all files contained in it.

A system for customized display of a computer filesystem artifact disclosed herein further including a rule where the rule comprises a first condition with an associated first visual representation of the artifact, and a second condition with an associated second visual representation of the artifact. In an embodiment of the invention the first condition specifies the stored content size be less than a predefined threshold and the second condition specifies that the stored content size be greater than a predefined threshold. An embodiment of the invention further utilizing a current time obtained by the computer clock, where the current time is a number, and wherein the first condition specifies that the difference between the current time and the access time is less than a predefined threshold, and the second condition specifies that the difference between the current time and the access time is greater than a predefined threshold.

Figure 5:
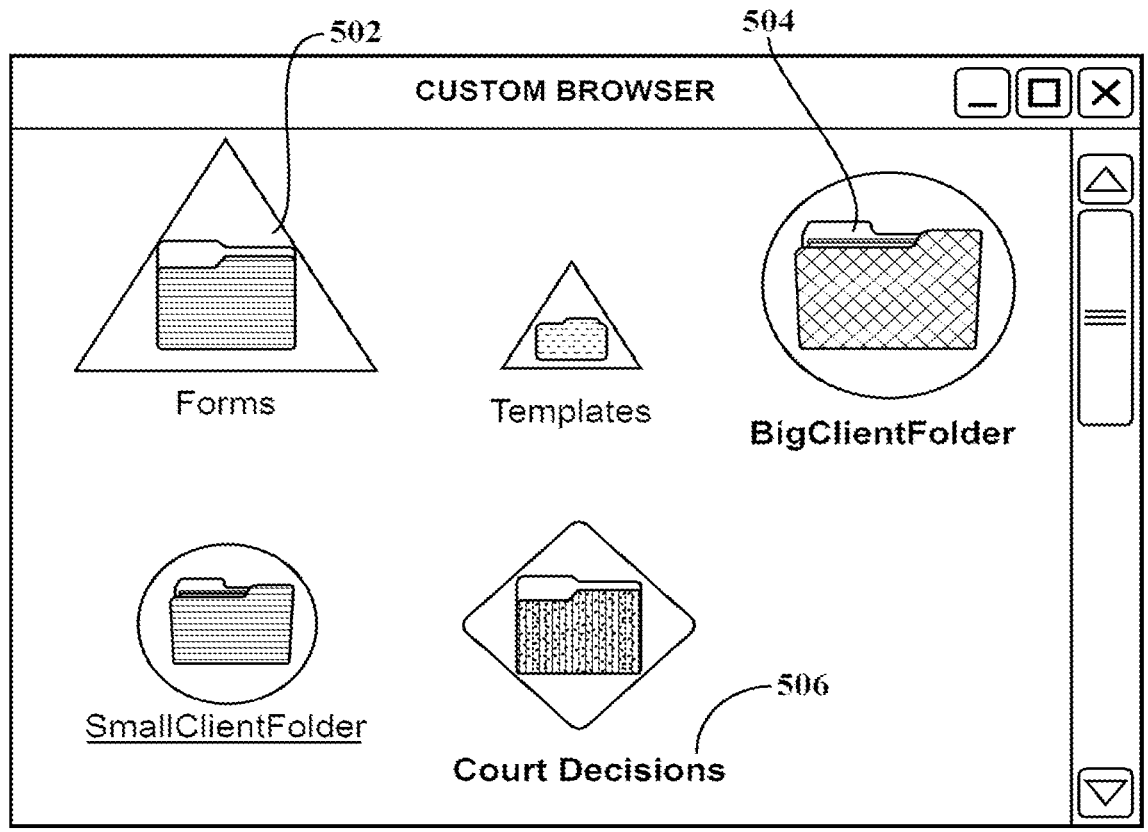
FIG. 5 depicts a customization of the file browser where the customized view includes incorporating a unique shape superimposed on the file and folder icons that can include user-customized colors.

FIG. 5 depicts a customization of the file browser where the customized view includes incorporating a unique shape superimposed on the file and folder icons that can include user-customized colors. Users who may also like to give a hierarchy within these shapes can also organize folders having different shaped icons. The system permits sorting and searching of folders by their shapes. The system allows for the user to select from a plurality of predefined shapes, such as rectangle, triangle, circle etc., to be used in conjunction with other attributes and styles used for the folder icon. In an embodiment of the invention, the user is also being permitted to define shapes of their choice. As an illustration, the user can draw a tree for a folder relating to an environmental matter, or a dumper truck for a construction matter or a transmission line for an electricity matter. Additionally, the user can associate a company's icon as a visual attribute of a folder by copying and pasting the icon on to the property definition of a folder.

TABLE 1

Rules for Time Dependent Color Modifications (a)

| | Rule | > |
|---|---|---|
| | Tools | |
| • | Red | CTRL + 1 |
| • | Green | CTRL + 2 |
| | Yellow | CTRL + 3 |
| ✓ | Show Hints | |
| | Close Window | CTRL + W |

TABLE 1-continued

Rules for Time Dependent Color Modifications (b)

Rule
No Modifications:- In 30 days
Set Color to Yellow In 60 days
Set Color to Red In 90 days
Exceptions
Notes The customized browser disclosed permits user to search for folders or files of a particular shape 506 in any sub-folder of any folder or any disk or system. It permits the user to ask to see all folders of particular shape in conjunction with other criteria such as size range of the folder contents, or that the folder is annotated with one or more colors. By way of an illustration, a user can give the shape of a triangle 502 to all client folders relating to fee, shape of a circle to the folder of a client who is in arrears of fee 504. The user can therefore ask the system to show all folders that are circular so that clients who are in arrears are identified.

Figure 6:
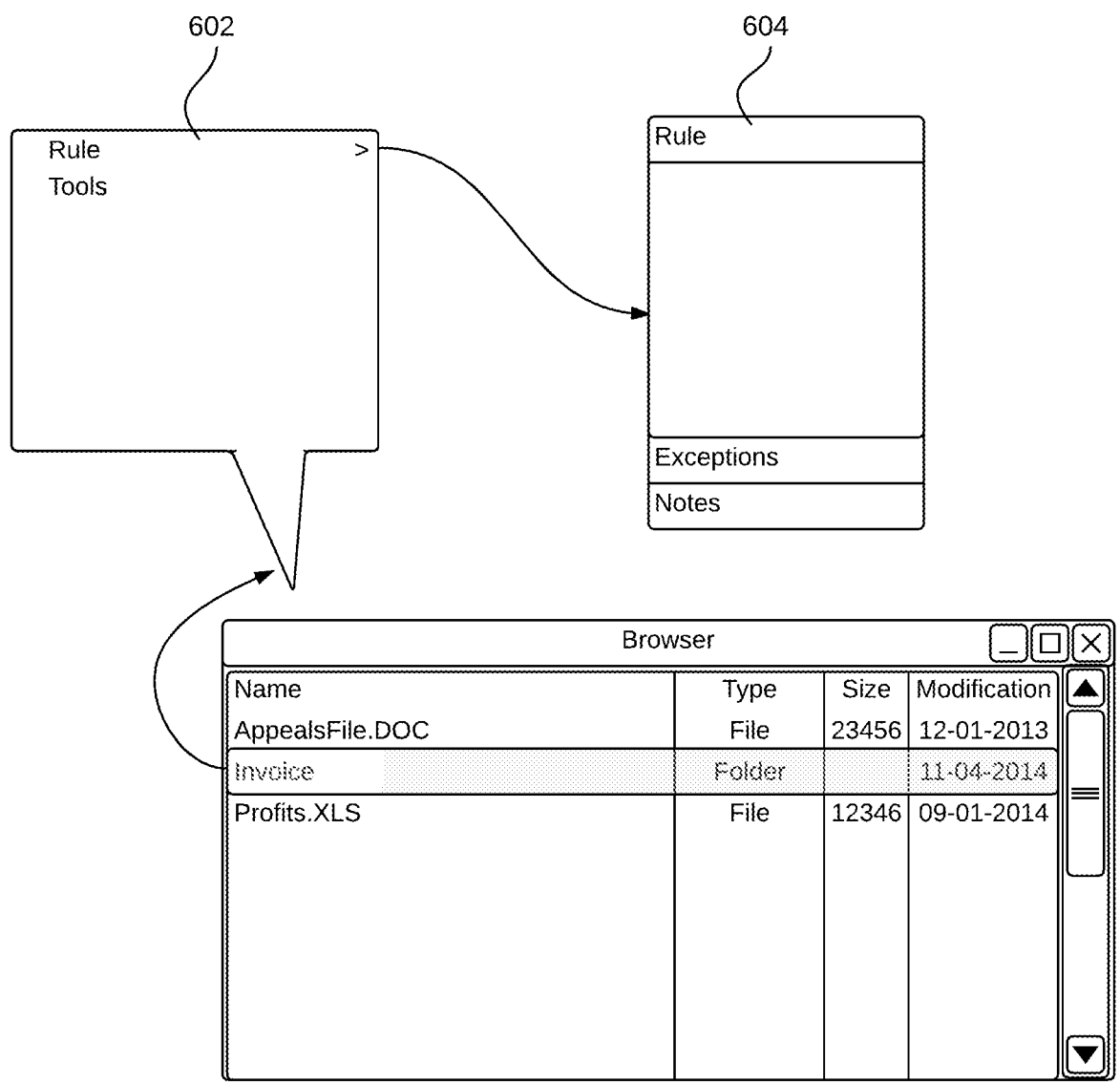
FIG. 6 illustrates a customization of a folder and file color in a time dependent manner where the color, size, or shape or other attributes changes when the file is not worked upon for a predefined period of time.

FIG. 6 illustrates a customization of folder and file color in a time dependent manner where the folder or the file color changes when an important file has not worked upon for a predefined period of time. In an embodiment of the invention the user specifies a rule for coloring a folder to draw attention to the important file. As illustrated in FIG. 6 and Table 1 (a), the color of the folder is dictated by the history of modification to the files in the folder. This is the situation where the folder contains files that need to be regularly worked upon. When files in such a folder are being worked up regularly, color of the folder is green 602—the default folder color specified by the rule 604 as shown in Table 1 (a). The disclosed customized file browser interacts with the system clock and with the modification timestamp on all the files in the hierarchy below a folder to render the time dependent folder visualization. If no files have been modified for a period of thirty-days as shown in Table 1 (b), the folder color is changed to yellow. And, if the files in the folder have not been modified for over sixty-days, the folder color is changed to red.

The system allows for specification of a VIP folder at any level. The user can designate any filesystem artifact—file, folder or media—as a VIP Artifact. As a result of such a designation, the artifact appears in a system wide VIP folder. It is also possible to specify additional criteria for an artifact to show up in the system wide VIP folder. As an illustration, if there is no activity on it for a predefined number of days (example, 5 days), the rule in Table 1 (b) may provide that shortcut to the folder shows up in the system wide VIP folder. Alternatively, when a document is saved into a designated folder, a shortcut to that folder is automatically added to the system's VIP folder. Such VIP enabled folders are prescribed at any level of folders. As an illustration, any red colored artifacts that require action within five days are added as shortcuts to the system wide VIP folder.

Figure 7:
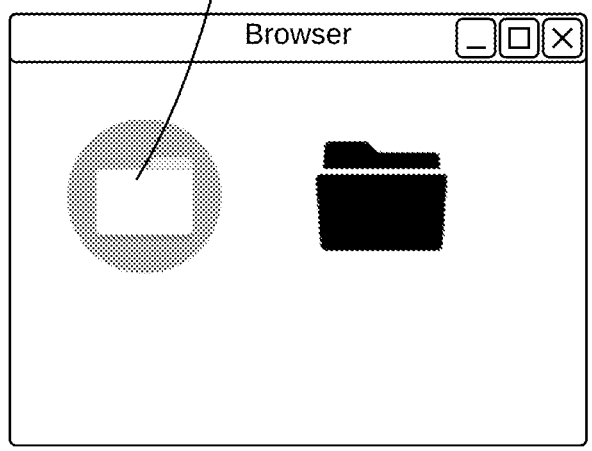
FIG. 7 illustrates an interface for customization of file and folder visualization with a plurality of sub-rules relating to file sizes, the duration of non-modification, and the scope of visualization.

FIG. 7 in conjunction with Table 2 illustrates an interface for customization of file and folder visualization with a plurality of rules relating to file sizes, the duration of non-modification, and the scope of visualization to a single folder or all the sub-folders.

In an embodiment of the invention, a set of three rules 702 shown in Table 2 are used to manage the size of the icons and color of the icon used for the visualization of a folder. The rule based annotations for the filesystem artifacts are specified with three sub-rules. In the first sub-rule, SubRule1 shown, the folder color changes to red if there is no modification to any files contained therein for five (5) days.

The second sub-rule, SubRule2 shown provides that the size of the folder icon be increased if the files contained in the therein exceed 100 MB.

Finally, third sub-rule, SubRule3 states that the folder be added to the system-wide VIP folder there is no activity on any file in the folder for a period of thirty-days. A similar set of rules can be prescribed for other filesystem artifacts. This specification is an illustration of the generality of the dynamic annotation changes that the system supports.

TABLE 2

Mixed Rules for Files and Folder Presentation
RULE SPECIFICATION

|   |   |   |
|---|---|---|
|   | SubRule 1: | CTRL + R1 |
|   | Condition: |   |
|   | NoModification (5 d) | ALT + M |
|   | Action: |   |
|   | Color = Red |   |
|   | SubRule 2: | CTRL + R2 |
|   | Condition: |   |
|   | Size >100 MB | ALT + S |
|   | Action: |   |
|   | IconSize++ | > |
|   | SubRule 3 | CTRL + R3 |
|   | Condition: |   |
|   | NoModification (30 d) | ALT + M |
|   | Action: |   |
|   | Move to VIP |   |
| • | Apply to Subdirectories | CTRL + 1 |
|   | Apply Only to this Directory | CTRL + 2 |
| ✓ | Show Hints |   |
|   | Close Window | CTRL + W |

A system for customized display of a computer filesystem is disclosed herein comprising: a display surface, a plurality of artifacts, wherein each artifact has a name where the name has a 'name visual representation' that includes a font name, a font weight, font style, and a font color, has an icon where the icon has an icon visual representation that includes an icon type and an icon, is a part of the computer filesystem, is related to a plurality of immediate parent artifacts, and is related to a plurality of immediate child artifacts; a rendering subsystem that creates the customized display of the plurality of artifacts on the display surface by organizing in a predefined manner a visual representation of the plurality of artifacts, wherein the visual representation of an artifact includes the visual representation of artifact's name and the visual representation of artifact's icon; and the plurality of artifacts displayed on the display surface, wherein each of the artifact displayed is related to each of the other artifact displayed. In an embodiment of the system, the visual representation of the name and the visual representation of the icon are predetermined by a content of the artifact. In an embodiment of the system, the visual representation of the name and the visual representation of the icon of an artifact are applied recursively to the immediate child artifacts. In an embodiment of the system, the artifacts are adapted for a search by visual representation of the name or by the visual representation of the icon.

Figure 8:
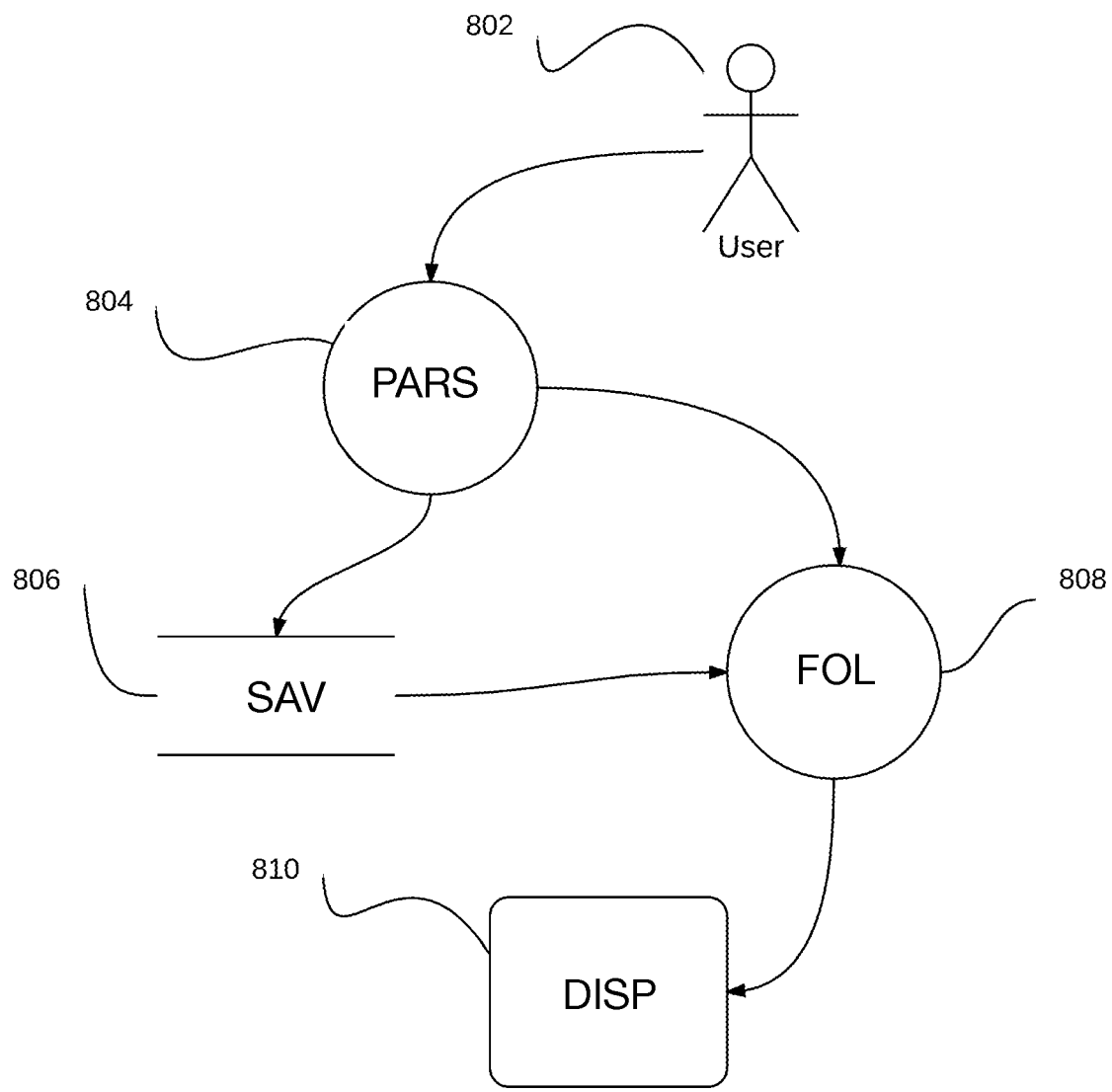
FIG. 8 illustrates the flow of information in the use case where customization parameters are used for searching files and folders using visual customization attributes.

FIG. 8 illustrates the flow of information in the use case where customization parameters are used for searching files and folders. Current methods for searching for files on a computer system is limited to identifying files or folders by the name of the file or folder or by some character string contained in its name or within the file. This severely limits the options of users in that if they want to find that file or folder on searching by a number of options then the option for search is virtually only a character string that is often common to many files. The system disclosed increases the search choices to users so that they can define several other properties 804—such as annotation or visualization based parameters PARS—for which can be independently or conjunction with other standard name searched parameters SAV that are previously used as search criteria 806. Hence it enables the user to assign visual characteristics, properties, or attributes that can be used to search for the file or folder that user 802 is looking for. It also has the advantage that files and folders can be marked in a manner that assists quick identification such as because the color, icon size, highlighting or bold or underlining or combinations of these can be used for searching.

In an embodiment of the invention, the user can search 808 for files or folders FOL by a criterion where user defines the colors appearing in the name of the file or folder. Thus, for instance if the user asks to be shown in a given folder all files that have red and green in the file name but are not highlighted then that search would quickly lead to the desired files and display the results 810.

In an embodiment of the invention, the customized file browser is implemented as a shell that overlays a computer's file system. It retrieves the list of files and folders on a file system and incorporates a set of attributes and rules with each file or folder. These attributes allow the users to change the size of the icons, folders and files of a computer system to have varying sizes, as well as provide font specifications for how the names of files and folders are displayed. An embodiment of the system, by utilizing an appropriate indexing node for a specialized filesystem, permits the user to copy the customization data so it is copied to compatible filesystem and retains the customization. Thus the folders, files and media can be viewed in a similar manner in the other computer system without the need to re-add these annotations. Similarly, if the sender and recipient use a compatible filesystem, such data is transferable by email as file attachments. In an embodiment of the system, the filesystem is associated with a customized filesystem browser application. A recipient computer system using this customized file browser would immediately identify the file as containing annotation data and save it for further interpretation by the customizable file system browser so that the person viewing the filesystem artifact will have an identical visualization as the person who created it.

In an embodiment of the invention, in addition to names, all filesystem artifacts—folders, files and media—may also include bar codes or other such machine-readable codes. This assists in quick identification of files by other computers or devices. The bar codes are included as a part of the icon visualization in an embodiment of the invention. The bar-code or another machine readable code enables another device to rapidly read the code and search for the desired file.

In an embodiment of the invention, the user is permitted to define standard options for the filesystem artifacts to change colors, size etc. on the happening of certain contingencies. The customizable filesystem browser provides predefined standard templates and their storage and reusability. Hence the user has the option of specifying these options and simply choosing them or choosing one and then applying customization.

Computer systems usually maintain files and folders in secondary storage (such as disks, tapes, floppies, pen drives, cloud etc.). File management systems maintain a file allocation table or a directory structure that includes the names of the files or folders, a pointer to the actual file, and additional descriptive attributes including permissions granted to the file or folder. The entries in the file allocation directory structure also designates if a specific entry pertains to a file or a folder. In cases of different media (Drives, external drives, pen drives, CD drives etc.) the media attributes are also typically maintained in the directory structure or in a clipart database associated with files in a folder. The type of file (Word, PDF, Excel etc.) is also a file attribute and is also typically maintained in the directory structure.

Given that currently systems do not allow the type of annotations and visualization disclosed, an embodiment of the invention implements these features by defining a new file type called the "SAP" filesystem. It new SAP filesystem, the file allocation table or the directory structure also stores information on the various annotation options for the filesystem artifacts. Thus for instance the color, highlighting, font-weight, font-size, font-style, are stored along with the file name in the filesystem index-Node for the file. The filesystem search operations based on the annotations retrieve this information to perform the customization annotation searches.

Further, an embodiment of the invention includes a display using different customized fonts or icons, pictures and videos or other multimedia and to play sounds associated with the files and folders. This is accomplished by including a hyperlink in the file description tables of the filesystem where the hyperlinks points to such fonts, icons, pictures, videos, other multimedia, sound clips on a reserved segment of the filesystem.

The inventions disclosed herein provides for operations that alter some of these display attributes for files and folders such as the color or font decorations of the filesystem artifact name or icon to change after a defined period of time, or on the occurrence or non-occurrence of an event, or upon a artifact size condition is satisfied or violated. An embodiment of the invention includes a pointer to a program Macros which is a piece of programming code written in a predefined computer language stored in the file description section of the file allocation table that stores information on the options exercised by the user for changing the file name attribute. In this manner, the attribute of file name and other properties remain separate and distinct and may be searched for independent of the options exercised by the user. The attribute changes are brought forth by the Macros.

The file attribute modification rule Macros are also copied and pasted when a file or folder is copied. The system provides a number of standard Macros for customization by the user. Additionally the user may define Macros independently.

Figure 9:
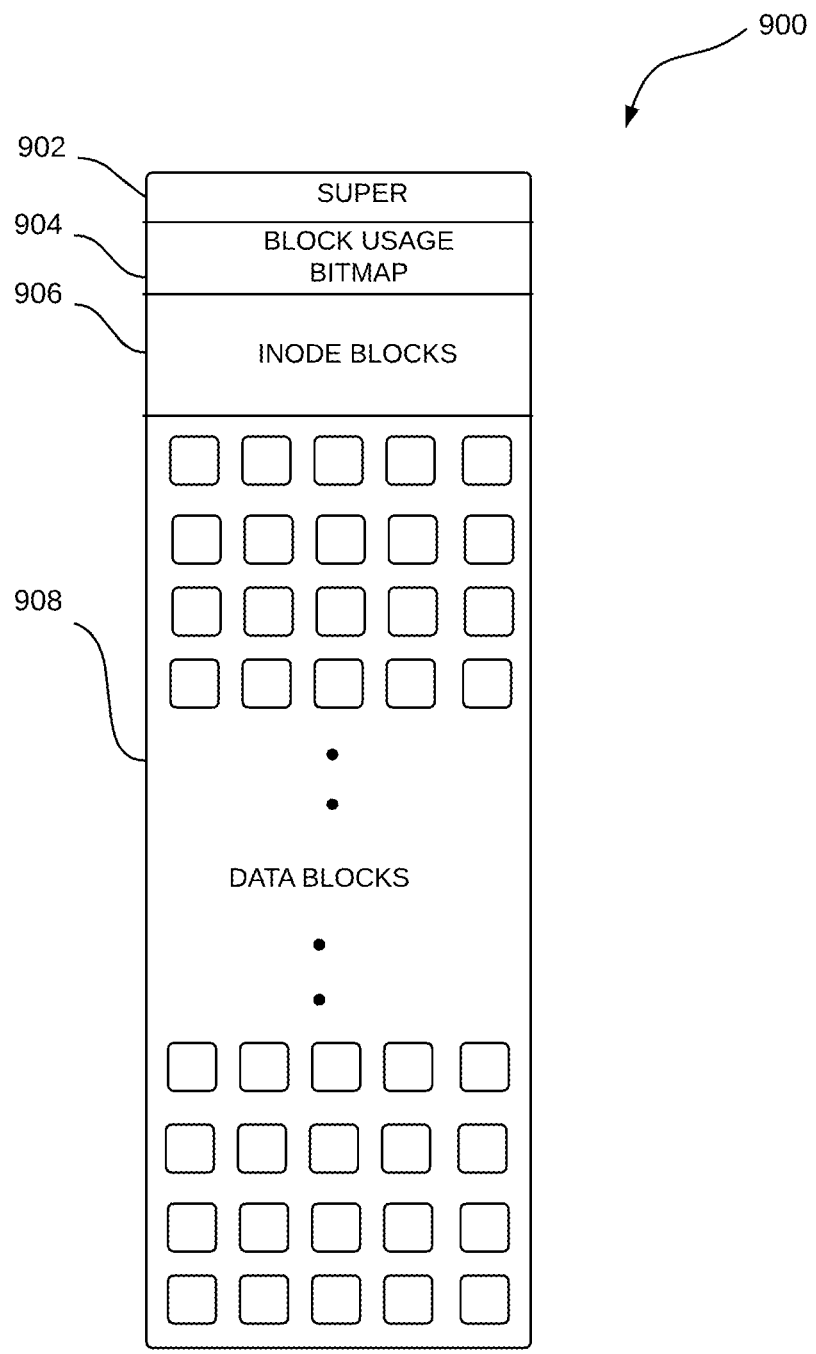
FIG. 9 illustrates the organization of a filesystem in an embodiment of the system where index-nodes or i-nodes are uses to store visual customization information for files and folders.

A filesystem 900 used in an embodiment of the invention is illustrated in FIG. 9. The filesystem contains a superblock 902 designating the filesystem type as SAP in an embodiment of the invention. The bitmap segment 904 of the filesystem stores information about the block usage for both the i-node blocks and the data blocks. This filesystem uses a plurality of i-nodes in a disk designated to store i-node blocks 906. The actual data blocks occupy the majority of the disk where the files and folders are store in data blocks 908. Each i-node is an index node for a file and stores the block pointers to the data blocks where the files is actually stored, as well as other information about the file. The existing file systems typically store the creation, modification, and access timestamps as well as information ownership and permission information.

Illustrated in Table 3 is the metadata stored in an i-node block for each file in an embodiment of the invention where SAP filesystem is utilized. As the illustration depicts, the i-node includes a plurality of meta-data information that the user can specify pertaining to formatting of the file names, the size of icons, the type of geometrical shapes to be attached to the folders, whether the filename and the icons are flashing, macros that specify the change of file renderings as a function of time or occurrence of events, QR and Barcodes associated with the files. These shaded cells in Table 3 specifically illustrate the visualization information for the filesystem artifacts.

TABLE 3

Meta-Data in File I-Node

| SIZE | NAME | DESCRIPTION |
| --- | --- | --- |
| 2 | MODE | Red/Write/Executed Permissions |
| 2 | UID | File Ownership |
| 4 | SIZE | File Size |
| 4 | TIME | Time file was last accessed? |
| 4 | CTIME | File Creation Time |
| 4 | MTIME | File Modification Time |
| 2 | GID | Group Identifier |
| 4 | BLK-CNT | Number of blocks allocated to this file |
| 128 | BLOCKS | A Set of Block Pointers |
| 8 | FORMAT | File Name Formatting |
| 4 | SHAPE | File Icon Shape |
| 64 | ICON | File Icon Image |
| 4 | FLASH | File Flashing Specifications |
| 48 | MACRO | File Rendering Macros |
| 16 | QRCODE | QR Code for File |
| 16 | BARCODE | Barcode for the File |

An embodiment of the invention further includes an associated sort code represented as a number wherein the sort code is dependent on the artifact name, the name visual representation and the icon visual representation, the access time, the create time, the update time, and the content size. In an embodiment of the invention, artifact's sort code is defined as:

$$S = \sum_{i=0}^{k} B^i + f_i$$

where B is a radix basis, i represents an annotation type, and $f_i$ is the fraction of annotation type i used in visual representation of the artifact.

Figure 10:
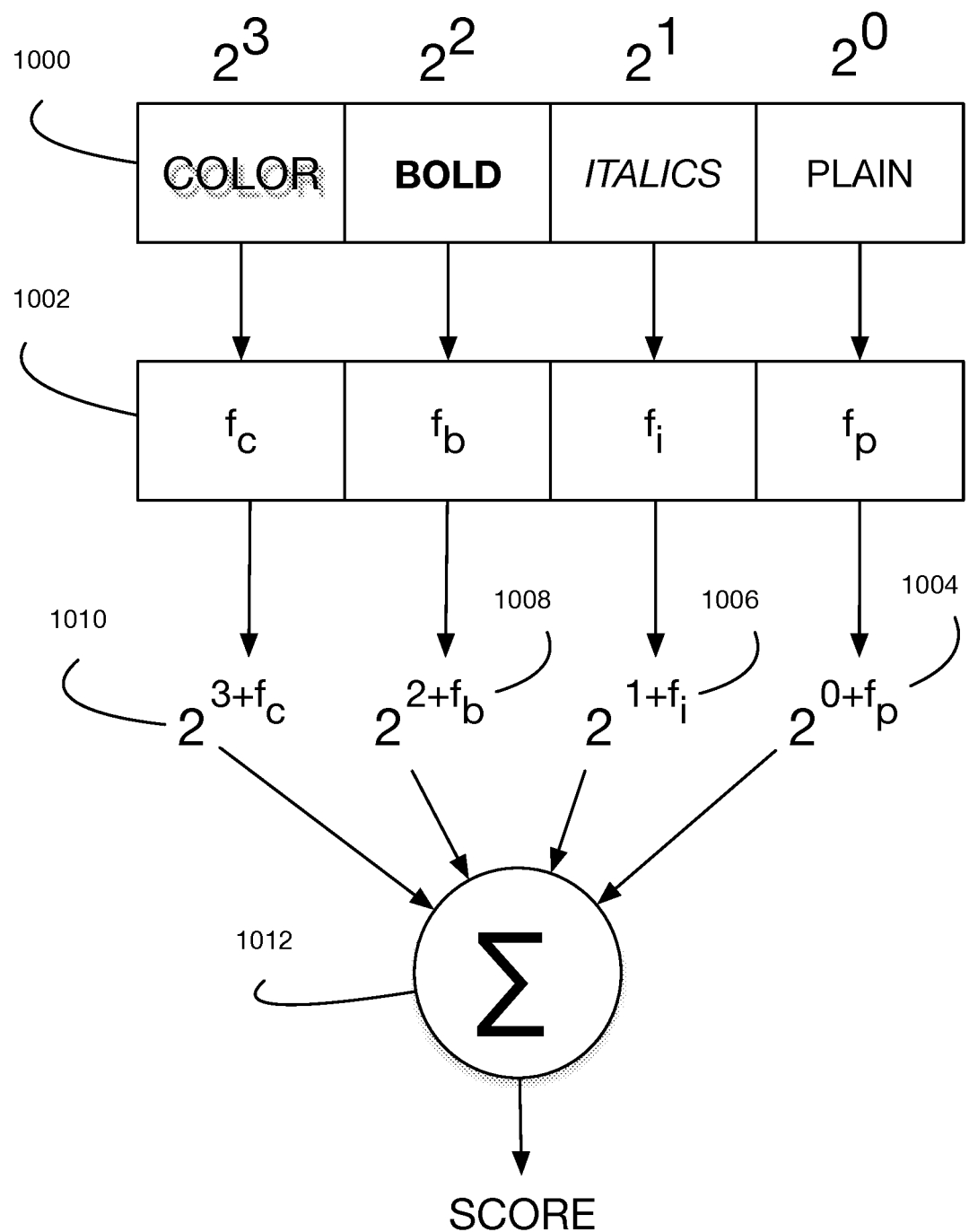
FIG. 10 depicts a flowchart for calculating a sorting score for the filesystem artifacts based on the visual customization styles applied to the filesystem artifact.

FIG. 10 depicts a flowchart for calculating a sorting score used artifacts based on the style attributes applied to the filesystem artifact for an example where the radix basis is 2, and four text annotation properties are considered. In the illustration shown, the user has defined a prioritization based on the font style used for visualizing the filesystem artifact's name. In the illustration shown, prioritization for the text style 1000 being the PLAIN text has the lowest priority, followed by the ITALICS text, and then the BOLD text, with the COLOR text having the highest priority. This prioritization is embedded in a radix basis utilized in determination of a sorting score representing the lexicographic ordering of the artifact names.

The fraction of the annotation name being plain, italics, bold, or color is represented by the variables $f_p$, $f_i$, $f_b$, and $f_c$ respectively 1002. These fractions are combined to create a score by using the contributions of the style fraction using an exponential weighting scheme. The weight for the plain text being $2^{(0+f_p)}$ 1004, for italics being $2^{(1+f_i)}$ 1006, for boldface being $2^{(2+f_b)}$ 1008, and for the color being $2^{(3+f_c)}$ 1010. These individual weights are then combined to yield the sorting score or rank for the display as shown in Eq. (1):

$$S=(2^{0+f^p})(2^{1+f^i})+(2^{2+f^b})+(2^{3+f^c})$$ Eq. (1)

By the way of an example then annotation name that is 100% bold receives a higher score (of $2^{(2+1)}$ or 8) than an annotation that is 100% italicized (score of $2^{(1+1)}$ or 4). An annotation that is only 50% bold still receives a higher score (of $2^{(2+0.5)}$ or 5.65) compared to the score of 4 for a 100% italicized annotation.

Disclosed is a system for customized display of a computer filesystem where the plurality of artifacts are displayed on the display surface using a lexicographic scheme defining an ordering relationship defining a plurality of conditions whereby a first artifact is greater than a second artifact, whereby the first artifact is displayed in a predefined position on the display surface with respect to the second artifact. In an embodiment of the system, the lexicographic scheme defines that the first artifact A is greater than the second artifact B is defined by the formula:

$$A > B = (f^A_{X_1} \neq f^B_{X_1} : f^A_{X_1} > f^B_{X_1} :$$
$$(f^A_{X_2} \neq f^B_{X_2} : f^A_{X_2} > f^B_{X_2} :$$
$$\ldots$$
$$(f^A_{X_i} \neq f^B_{X_i} : f^A_{X_i} > f^B_{X_i} :$$
$$\ldots$$
$$(f^A_{X_k} \neq f^B_{X_k} : f^A_{X_k} > f^B_{X_k} :$$
$$\text{False})\ldots)\ldots))$$

With the logical sorting function utilized artifact name having even a slight fraction of the highly weighted visualization annotation receives a higher lexicographic ranking when compared to an artifact name that is completely decorated with a visualization annotation that has a lower weight. So, for example, a file-A that has 50% of its name is boldface font will receive a higher ranking compared to file-B that has 25% of its name in boldface font and 75% of its name in italics font. While file-B will be ranked higher using the numerical scheme described by Eq. (1) and FIG. 10, the logical formulation of Eq. (2) will rank file-A higher than file-B:

$$A > B = (f^A_C \neq f^B_C \ ? \ f^A_C > f^B_C :$$
$$(f^A_b \neq f^B_b \ ? \ f^A_b > f^B_b :$$
$$(f^A_i \neq f^B_i \ ? \ f^A_i > f^B_i : (f^A_p \neq f^B_p \ ? \ f^A_p > f^B_p : F))))$$ Eq. (2)

It will be appreciated by one skilled in the art that in the formalism above, the operator (Condition?X:Y) performs the action X when the Condition is true, and the action Y if the condition is false. Furthermore, the notation $F_C^A$ denotes the fraction of the name of file-A being displayed in color. In this manner, the lower priority visualization annotations are only considered when the fraction of the higher priority.

A system for customized display of a computer filesystem is disclosed wherein the each artifact includes a number where the number equals to a recursive count of immediate children of an artifact, and the customized display of each of the plurality of artifacts further includes the display of the number. In an embodiment of the system, the visual representation of the icon includes an icon size wherein the icon size is proportional to the number associated with the artifact.

A method for customized display of computer filesystem artifacts is disclosed comprising: providing a computer filesystem wherein the filesystem includes a plurality of artifacts wherein each artifact has a name and an icon where the filesystem artifact has a name where the name has a name visual representation that includes a font name, a font weight, font style, and a font color, has an icon where the icon has an icon visual representation that includes an icon type and an icon type, an icon color, an icon size, and an icon shape; providing an input specification device wherein the input specification device receives information on one or more of the artifact name, the font name, the font weight, the font style, the font color, the icon type, the icon color, the icon size, and the icon shape; a search process adapted to identify a plurality of artifacts in response to the input specification and producing a result comprising of a plurality of artifacts; and displaying the result on a display surface of a display device.

Integration with Electronic Mail System:

The filesystem browsing application is designed to integrate with the functionality of an electronic mail system by the processes of defining an automatic processing and guided processing of files attached to an electronic mail message received or being sent by a user.

In an embodiment of the invention, a user defines an email address to monitor for attachments. The user then defines a plurality of default folder location for where documents attached to emails would be automatically saved, or the user will be prompted to save. The user may also define a distinct set of plurality of preferred folder locations from where documents may be attached or uploaded to emails sent to that email address, or choose the upload preferred folders to be identical to the preferred save folders. Furthermore, the invention disclosed provides the capability for defining "generic" domain names as emails such as "@abc.com" which will cover all of the user's clients in the domain "abc.com," or specifically capture documents attached to an email from, or be attached to an email to, a particular sender such as "joe@abc.com" and associate one or more specific folders therewith. Thereafter, the documents will be automatically be saved, or guided to be saved to that location, and when the user is composing an email to that sender, the system will prompt the user to similarly upload documents from the folders specified in a general or a specialized manner as desired by the user.

In an embodiment of the invention, the user can define the document types covered by these rules. Thus for instance the user will be permitted to indicate for each such email identifier if documents of certain types such as files with DOC, PPT, XLS, or PDF extensions be saved in a specific folder. Often emails contain useless attachments that the user does not want to save. The embodiment of the invention helps to filter out such attachments prevents from so that useless files (such as logos and signatures and icons often attached to emails) from being unnecessarily saved automatically. In guided save, the user is prompted to save the documents in the preferred folder locations previously defined by the user—the user however gets to pick the attachments to actually save.

A system for customized processing of electronic mail is disclosed herein comprising: an email downloading subsystem adapted to download a plurality of email items from email server using predefined credentials wherein each of the plurality of email items includes a sender email address, an email content, and a plurality of email attachments wherein each of the plurality of email attachment has an attachment type, and attachment name, and an attachment icon; a filesystem having a plurality of folders, wherein each folder is uniquely identified by an identifier, and is adapted to store one or more of each of the plurality of email attachments; an email processing subsystem having a list of filesystem folders associated with the sender email address, and is adapted to examine the sender email address, for each of the plurality of email attachments, examine the attachment type, and perform a predefined attachment processing action; rendering subsystem adapted to create a visual representation of each of the plurality of email attachment based on a predefined attachment rendering rule. An embodiment of the system for customized processing of electronic mail disclosed further has the attachment processing action performed by the email processing subsystem is an automatic saving of one or more each of the plurality of email attachments to one or more the plurality of filesystem folders. An embodiment of the system for customized processing of electronic mail disclosed further has the attachment processing action performed by the email processing subsystem comprises: receiving an input from a user where the input includes the identifiers a plurality of filesystem folders; and saving of one or more each of the plurality of email attachments to one or more the plurality of filesystem folders included in the user input.

In an embodiment of the invention, the user can define up to three different default folders for saving files attached to email received from, for uploading files attached to an email, a specific email address. Thus when the user is browsing their emails and a document is received from such an email address, the user will be provided an option to choose one of these default folders to save the document. In addition to the predefined folders associated with the email address, other folder locations included are based on the last locations where the user saved a document and the user can use either one of these, or one of the preferred predefined folders, or to browse to and select totally different location to save the document. Similarly, while attaching documents to an email, in addition to the predefined folders associated with the email address, the user can browse to a totally different location to upload and attach a document to an email being composed. Thus, the user is automatically able to process emails from email addresses of interest. User has also the option of defining their new preferred folders when an email is received from an email address that is not previously associated with preferred save folders.

In an embodiment of the invention, the user can define a default folder location, or a plurality of folder locations, from where documents will be selected or uploaded and when the user composes a mail to that specific recipient identified by that email address. An embodiment of the invention enables the user to define either a default folder location(s) for saving, or default folder locations for uploading, or use the same folder location for downloading and uploading. The default folder locations used in an embodiment are based on the first recipient of the email for whom the default uploading locations are defined. An embodiment of the invention uses additional default upload locations based on the recent folder locations where the user while composing emails uploaded documents. From either of these locations the user can further browse. It will be appreciated by one skilled in the art that it is also possible to prescribe default folder locations based on the priority of the various recipients of the email. The default uploading locations for the person with the highest priority will then apply with the tie being broken in cases the highest priority is equal by the order in which recipient emails are listed. Naturally, the sender can always select a totally different folder at run time to select and attach a document to the email.

In an embodiment of the invention the user of the invention will be permitted to define the email addresses from where received documents are saved, guided to be saved, or guided for upload when composing an email to that address. The user can select a different set of folders for guided saving and guided uploading of documents. The folders for saving and for uploading can be different for each email address. The user can define the email address in a specific format, such as "joe@abc.com" or generically as "@xyz.com." If an email is received from a generic email address (i.e. anyone from the domain "xyz.com") and if a specific user sending the message and the attached document has an associated specific profile defined, then the specific user profile details override the generic definitions.

An embodiment of the invention saves all the documents attached to emails in a system default locations and thereupon an alerts the user to select move the documents to the folders associated with that email address of the document sender.

In an embodiment of the invention the email monitoring is performed in the background by a process separate and distinct from the email client being used. The user defines the email downloading rules using a graphical user interface. The email monitoring process then downloads and applies these rules to download the documents attached to specific emails and alert the user. The user continues to see the documents in their regular email client also without any disruption of their normal workflow. Thus, the document download in the background is performed, and the user alerted upon the arrival of the focus document, without disrupting the integrity of the email client utilized by the user.

The application disclosed accesses emails and examines to see if they are being sent from defined email address. And if this is the case, the relevant documents are saved to default locations and user alerted. The shape, color, and size annotations of the folders designated as the default location reflects the arrival of the new document(s) per the visualization rules specified by the user.

An embodiment of the invention enables the user to attach a processing program or a Macro to an email thread defining the default locations for saving and uploading documents dynamically for that thread. Where such a Macro or file containing the same is attached to the email thread, the definitions of default locations is overridden by the specification in the Macro.

Figure 11:
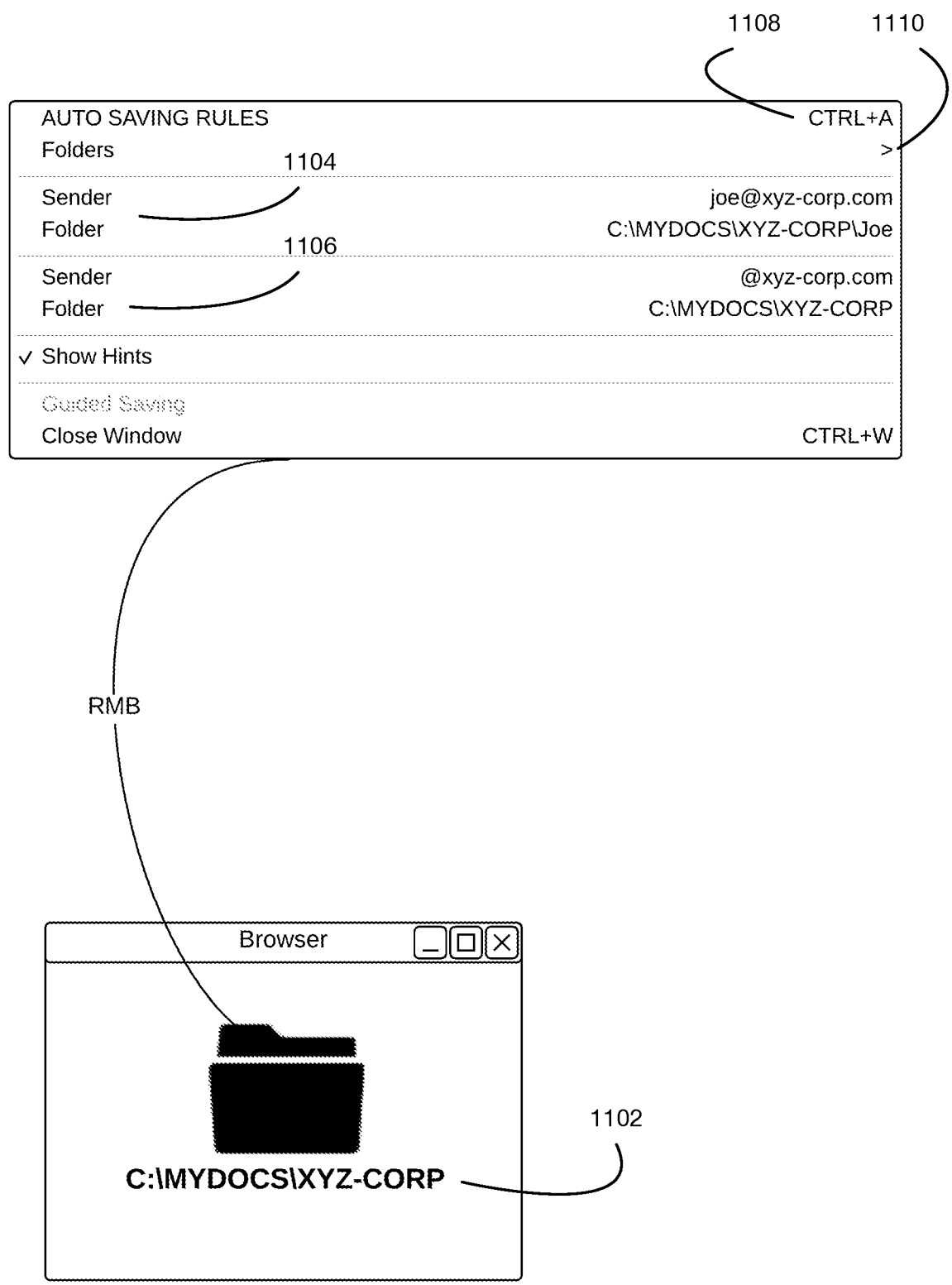
FIG. 11 illustrates an instance of the definitions of rules for automatic saving of email attachments from recipients associated with a specific email address or domain.

FIG. 11 illustrates an instance of the definitions of rules for automatic saving of email attachments from recipients associated with a specific domain. In an embodiment of the invention, the user specifies the rules for auto-saving to a specific folder 1102 by right clicking on the folder and defining how the attachments received from the specific senders will be auto-saved. In the illustration shown, the user defines a subfolder 1104 for automatically saving all files attached to emails received from a sender "joe@xyz-corp.com." The system will create this subfolder if one does not exist under the main folder designated 1106 for saving all attachment from anyone in the domain "xyz-corp.com." The keyboard shortcut 1108 allows for quick specifications for auto saving attachments to email from a specific sender or from anyone in a given domain. The system supports selecting folders 1110 for auto saving as the user recipient is setting up the auto saving rules.

Figure 12:
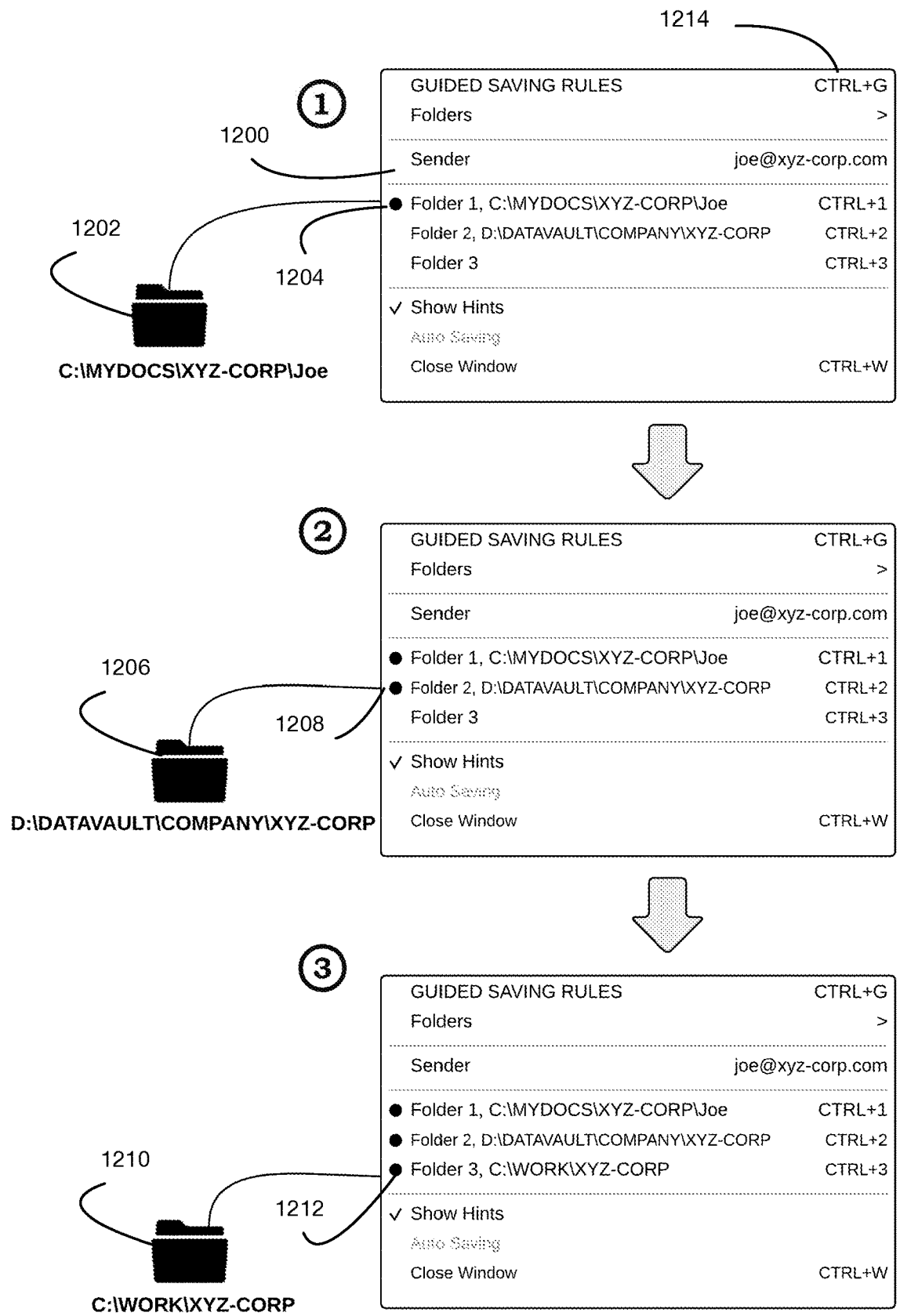
FIG. 12 illustrates the process of defining a plurality of folders associated with a specific sender for the purpose of guiding the recipient in saving electronic mail messages received from that specific sender.

FIG. 12 illustrates the process of defining a plurality of folders associated with a specific sender for the purpose of guiding the recipient in saving electronic mail messages received from that specific sender. The user recipient initiates the preferred folders for a guided save by selecting a folder 1202 and selecting that to be the first preferred folder 1204 for a specific sender 1200. Similarly, the user defines the second preferred folder 1208 by selecting the desired folder 1206.

The process of defining the preferred folders for recipients of emails from the user is similarly specified. When the user goes to compose an email to an recipient for whom a set of preferred folders have been specified, the user is provided with the ability to similarly select documents from the preferred folders associated with the recipient's email address.

While FIG. 12 is illustrated with a single email address for the sender, it will be understood by one skilled in the art that plurality of sender email addresses may be associated with a given folder for auto-saving as well as guided saving. This is appreciated because entities may be using multiple email addresses to send and receive emails, and as such those will be saved or be retrieved from a folder that reflects the identity of the entity.

Figure 13:
FIG. 13 illustrates the steps utilized for guiding the recipient in saving the set of files attached to an email received from a sender with a set of folders associated with the sender email address.
Figure 13:
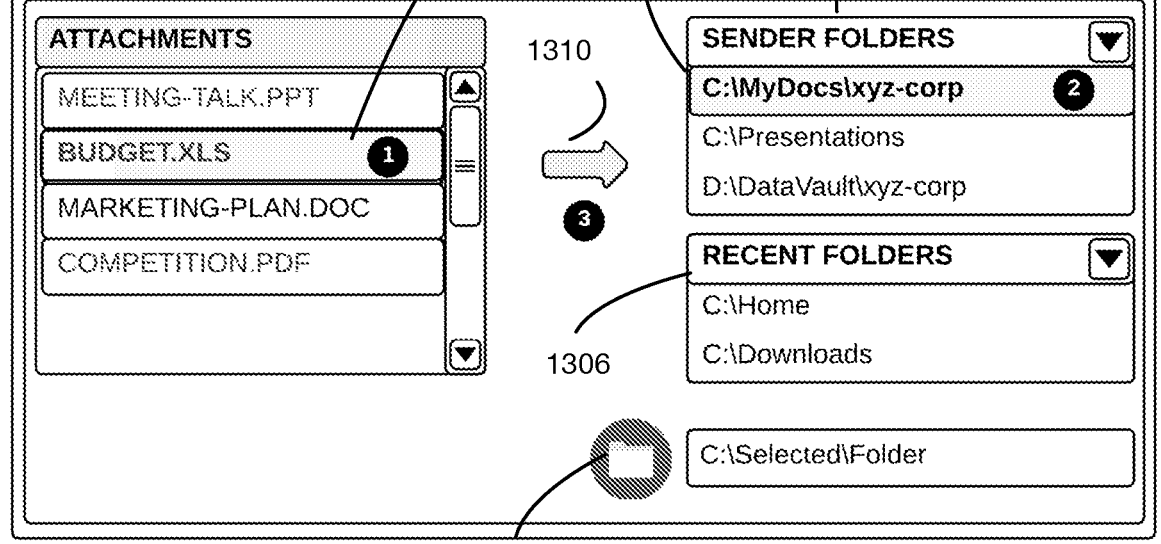

FIG. 13 illustrates the steps in the process utilized in an embodiment of the invention for guiding the recipient in saving the set of files attached to an email received from a sender with a set of folders associated with the sender email address. The user has previously designated a set of preferred Sender Folders 1300 for the sender 1301. The email application displays the set of files 1302 attached to the email from "JS@XYZ-CORP.COM." The user selects a file from the set of attachments and then selects a destination folder from the set of preferred folders associated with the sender's email address 1304, or from the set of recently accessed folders 1306, or selects an unrelated folder using the generalized filesystem browser icon 1308. Upon the selection of one or more of these folders, the user applies the command button 1310 to copy the selected attachment, or a group of attachments, to the selected folders(s). In the illustration shown, the user (1) Selects the attachment named "BUDGET.XLS," (2) Selects one of the preferred sender folders "C:\MyDocs\xyz-corp," and (3) Selects the command button to save file in the designated folder.

Figure 14:
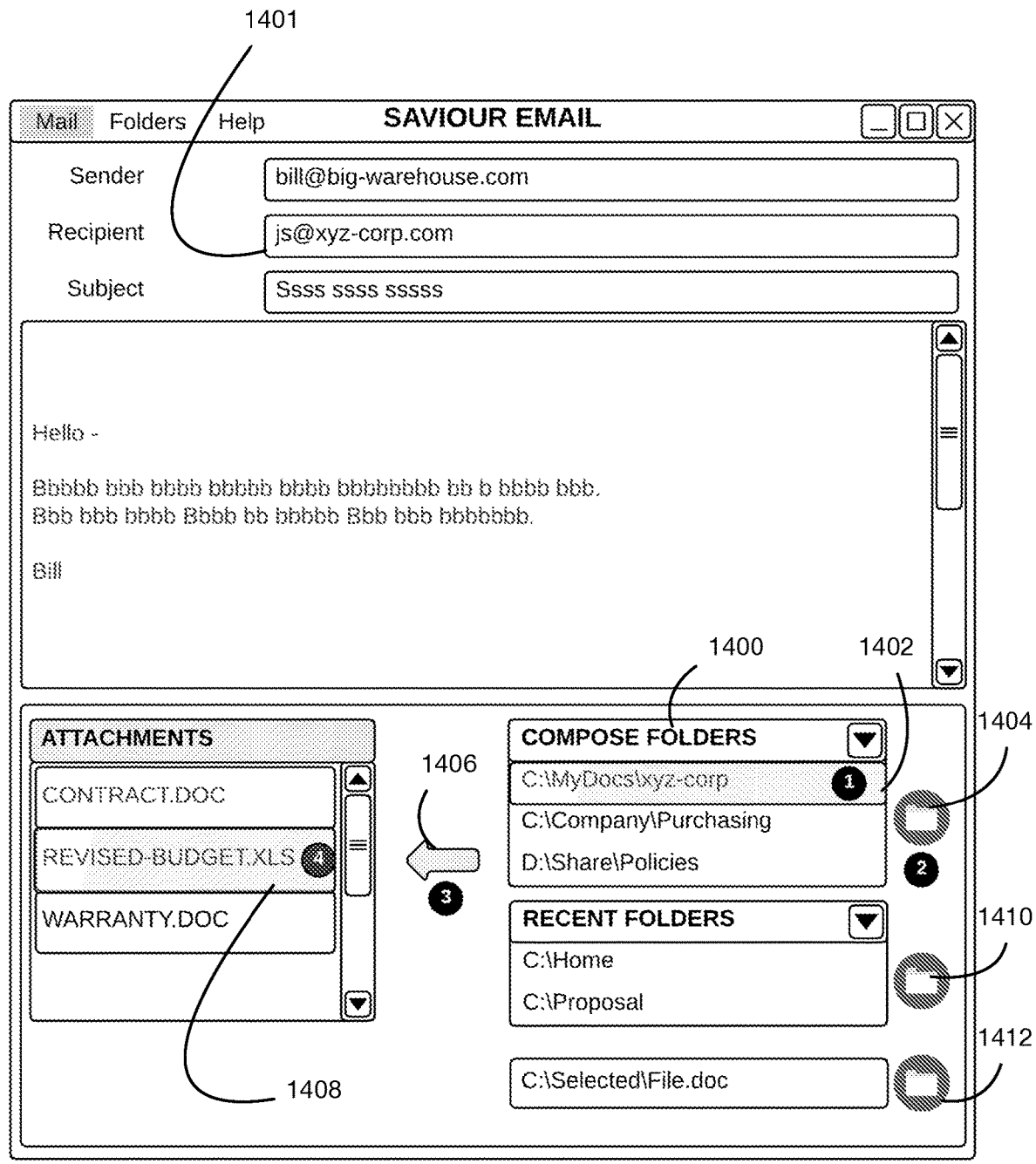
FIG. 14 illustrates the steps utilized for guiding the sender in selecting files to attach to an email being composed for a recipient with a set of folders associated with the recipient email address.

FIG. 14 illustrates the steps in the process utilized in an embodiment of the invention for guiding the sender in selecting files to an email being composed for a recipient with a set of folders associated with the recipient email address. Again the user has previously predefined a set of Compose Folders 1400 associated with the composition of an email 1401. When the user wishes to attach a file to an email being composed, the file may be derived by selecting one of the Compose Folders 1402 and browsing the selected folder 1404. Selected files from the browser window are attached to the email being composed by the command button 1406 subsequent to which they appear on the list of attachments 1408 to the email being composed. Alternatively, the user may select files to be attached by browsing 1410 the folders recently accessed, or by browsing 1412—an unrelated folder. In the illustration shown, the user (1) Selects the preferred upload folder "C:\MyDocs\xyz-corp" that has been previously associated with the recipient, (2) Presses the command icon to browse that folder to select the file to attach, (3) Selects the file and presses the copy button to upload the file as an attachment, and (4) Receives confirmation that the desired file has been attached to the email being composed.

While several aspects have been presented in the foregoing detailed description, it should be understood that a vast number of variations exist and these aspects are merely examples, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the embodiments of the invention without departing from the spirit and scope of the appended claims. The foregoing description is illustrative of particular embodiments of the invention, but is not meant to be a limitation upon the practice thereof. The following claims, including all equivalents thereof, are intended to define the scope of the invention.

What is claimed is:

1. A method for processing of electronic mail comprising steps of:
    having an email application configured to download plurality of email items from an email server using predefined credentials wherein each of the plurality of email items includes
        a sender email address wherein the email address has a domain, and
        a plurality of email attachments wherein each of the plurality of email attachment has an attachment type, and an attachment name,
    having a plurality of folders on a filesystem, wherein each folder
        has an associated filename metadata and an associated icon metadata, where
            the filename metadata is stored on the filesystem and includes a font name, a font weight, a font style, and a font color, and
            the icon metadata is stored on the filesystem and includes an icon image, an icon color, and an icon size,
        is uniquely identified by an identifier,
        includes as its contents a plurality of files and folders as sub-folders,
        is configured to store the plurality of email attachments therein;
    the email application further having a plurality of folders associated with the sender email address or domain, and is configured to
        examine the sender email address or domain,
        for each of the plurality of email attachments
            examine the attachment type,
            and perform a predefined attachment processing action;
    wherein the attachment processing action is configured to
        save the plurality of email attachments to a plurality of predefined folders based on sender email address or domain, and
        update the filename metadata, the icon metadata, or both the filename metadata and the icon metadata of the plurality of folders where the email attachments are saved.

2. The method for processing of electronic mail of claim 1 wherein the attachment processing action results in an automatic saving of one or more each of the plurality of email attachments to one or more of a predetermined set of plurality of folders, wherein the filename metadata, the icon metadata, or both the filename metadata and the icon metadata are updated using predefined visualization rules.

3. The method for processing of electronic mail of claim 1 configured to:

receiving an input from a user where the input includes identifiers for a plurality of folders, an associated with a sender email address or a sender domain, and an associated visualization rule specifying filename metadata, an icon metadata, or both filename metadata and icon metadata to associated with the identified plurality of folders.

4. The method for processing of electronic mail of claim 3 further configured to:
having the user specify a focus document,
having the user receive an alert upon receiving the focus document as one of the plurality of email attachments.

5. The method for processing of electronic mail of claim 1 further configured to:
creating a customized display of the a plurality of files and folders on
a display surface configured to display the plurality of files and folders;
a visual representation associated with each of the plurality of files and
folders, where the visual representation further comprises of
a name visual representation, wherein the name visual representation is configured to use the filename metadata,
an icon visual representation, wherein the icon visual representation is configured to use the icon metadata,
the email application further configured to create the customized display of the plurality of files and folders on the display surface by using the name visual representation and the icon visual representation of the plurality of folders where the email attachments are saved.

6. The method for processing of electronic mail of claim 5, wherein the icon size of the icon visual representation for each of the plurality of folders is proportional to a number of files contained within the folder or in its sub-folders.

7. The method for processing of electronic mail of claim 5 wherein
the visual representation of each of the plurality of folders further includes a number equal in value to a count of the files stored within the folder or within any of the subfolders contained therein, and
the visual representation for the folder includes a number on the display surface, where the visual representation of the number is spatially proximate to the visual representation of the folder icon or the visual representation of the folder name or both.

8. The method for processing of electronic mail of claim 5 wherein
the visual representation of each of the plurality of folders is recursively applied to its contents including the plurality of files and sub-folders contained therein.

9. The method for processing of electronic mail of claim 8 wherein the visual representation of each of the plurality of files or folders
includes a sort code used as a lexicographic order value,
a position on the display surface, wherein
the position on the display surface is determined by using the lexicographic order value associated with the file or folder.

10. The method for processing of electronic mail of claim 9 where the sort code is defined as $$S = \sum_{i=0}^{k} B^i + f_i$$

where B is a radix basis, i represents the filename metadata including font name, font weight, font style, and font color, and
$f_i$ represents a fraction of the specific name visual representation i used in the visual representation of the file or folder.

11. The method for processing of electronic mail of claim 9 wherein the lexicographic ordering scheme defines that a first file or folder A is greater than a second file or folder B when the following boolean expression is true:

$$A > B = (f_{X_1}^A \neq f_{X_1}^B : f_{X_1}^A > f_{X_1}^B :$$
$$(f_{X_2}^A \neq f_{X_2}^B : f_{X_2}^A > f_{X_2}^B :$$
$$...$$
$$(f_{X_i}^A \neq f_{X_i}^B : f_{X_i}^A > f_{X_i}^B :$$
$$...$$
$$(f_{X_k}^A \neq f_{X_k}^B : f_{X_k}^A > f_{X_k}^B :$$
$$\text{False})...)...))$$

where $X_1$, $X_2$ through $X_k$ are filename metadata or icon metadata for file or folder names and file or folder icons respectively, and
$f_{X_i}^A$ and $f_{X_i}^B$ represent a fraction usage of filename metadata or icon metadata $X_i$ by the file or folder A and file or folder B respectively.

12. The method for processing of electronic mail of claim 8 further utilizing a create time, an access time and a current time, where the access time and the create time are associated to each of the plurality of files or folders;
having the email application be further configured to create the customized display of the plurality of files and folders on the display surface by including processing steps of
specifying that a first condition as being met when a difference between the current time and the access time is greater than a first predefined threshold, specifying that a second condition as being met when a difference between the current time and the create time is greater than a second predefined threshold,
and
using a first visual representation for the file or folder when neither the first nor the second condition is met,
using a second visual representation for the file or folder when the first condition but not the second condition is met,
using a third visual representation for the file or folder when the second condition but not the first condition is met, and
using a fourth visual representation for the file or folder when both the first and the second condition are met.

13. The method for processing of electronic mail of claim 1 wherein each of a subset of the plurality of folders has a designation of a VIP folder where
a predefined filename metadata and a predefined icon-metadata is associated with each of the VIP folders,
a predefined set of sender email addresses or domains are associated with the VIP folders, and
the attachment processing action includes an automatic saving of one or more each of the plurality of email attachments associated with the predefined set of sender email addresses or sender email domains into the VIP folders.

14. The method for processing electronic mail of claim 1 wherein:
   the email application is further configured to sending emails where the emails
      include a receiver email address wherein the receiver email address has a receiver domain, and an email being sent further includes a plurality of email attachments;
   where the email application performs a processing of the email attachments for the email being sent by applying a sending email processing step where the sending email processing step includes a matching of the receiver email address or the receiver domain to a predefined value and attaching to the email a plurality of files and folders selected from a predefined folder.

* * * * *